United States Patent [19]

Kostek et al.

[11] Patent Number: 5,852,587

[45] Date of Patent: Dec. 22, 1998

[54] METHOD OF AND APPARATUS FOR SONIC LOGGING WHILE DRILLING A BOREHOLE TRAVERSING AN EARTH FORMATION

[75] Inventors: Sergio Kostek; Shu-Kong Chang, both of Redding, Conn.; Gordon McDaniel, Houston, Tex.; Thomas Plona, New Milford, Conn.; Curtis Randall, Missouri City, Tex.

[73] Assignee: Schlumberger Technology Corporation, Sugar Land, Tex.

[21] Appl. No.: 839,969

[22] Filed: Feb. 20, 1992

Related U.S. Application Data

[63] Continuation-in-part of Ser. No. 548,169, Jul. 5, 1990, abandoned, which is a continuation-in-part of Ser. No. 288,742, Dec. 22, 1988, abandoned.

[51] Int. Cl.[6] .......................................................... G01V 1/40
[52] U.S. Cl. ............................. 367/25; 367/82; 181/102; 175/50
[58] Field of Search ......................... 367/25, 82; 381/205, 381/158; 181/102, 196, 207; 175/50

[56] References Cited

U.S. PATENT DOCUMENTS

| | | |
|---|---|---|
| 2,350,371 | 6/1944 | Smith . |
| 2,757,358 | 7/1956 | Ely . |
| 2,788,510 | 4/1957 | Howes . |
| 3,054,471 | 9/1962 | Knudsen . |
| 3,063,035 | 11/1962 | Vogel et al. . |
| 3,093,810 | 6/1963 | Geyer et al. . |
| 3,136,381 | 6/1964 | Anderson . |
| 3,144,090 | 8/1964 | Mazzagatti et al. . |
| 3,161,256 | 12/1964 | Pardue . |
| 3,190,388 | 6/1965 | Moser et al. . |
| 3,191,141 | 6/1965 | Schuster . |
| 3,191,142 | 6/1965 | Lebourg . |
| 3,191,143 | 6/1965 | Pardue . |
| 3,213,415 | 10/1965 | Moser et al. . |
| 3,271,733 | 9/1966 | Cubberly, Jr. . |
| 3,288,245 | 11/1966 | Anderson . |
| 3,364,463 | 1/1968 | Pardue . |
| 3,381,267 | 4/1968 | Cubberly, Jr. et al. . |
| 3,493,921 | 2/1970 | Johns . |
| 3,504,757 | 4/1970 | Chapman, III . |
| 3,608,373 | 9/1971 | Youmans . |
| 3,982,606 | 9/1976 | Berry et al. . |

(List continued on next page.)

FOREIGN PATENT DOCUMENTS

| | | |
|---|---|---|
| 716013 | 2/1980 | U.S.S.R. . |
| 752296 | 7/1956 | United Kingdom ..................... 367/25 |

OTHER PUBLICATIONS

Thomas G. Barnes et al., "Passbands for Acoustic Transmission in an Idealized Drill String," *The Journal of the Acoustical Society of America*, vol. 51 No. 5 (Part 2), pp. 1606–1608.

Lord et al, Materials Evaluation, Nov. 1977, pp. 49–54, vol. 35, #11.

*Primary Examiner*—Nelson Moskowitz
*Attorney, Agent, or Firm*—Wayne I. Kanak; Henry N. Garrana; John J. Ryberg

[57] ABSTRACT

The present invention is directed to sonic logging while drilling. A transmitter and at least one receiver are mounted on a drill collar for performing sonic investigations of the formation traversing a borehole. It has been discovered that a drill collar has a natural stop band or notch where acoustic energy propagating in this frequency range is severely attenuated. Thus, to reduce drill collar acoustic coupling, the transmitter is operated within this natural stop band of the drill collar. An imperforate stop band filter is also included between the transmitter and receiver to amplify the natural stop band. The transmitter is mounted transvere to the longitudinal axis of the drill collar, and is preferably mounted within means that reduce drill collar acoustic coupling. The transmitter preferably includes a material whose acoustic response is more favorable along its longitudinal axis relative to its radial axis, thereby directing the acoustic energy into the formation rather than the surrounding drill collar.

67 Claims, 11 Drawing Sheets

U.S. PATENT DOCUMENTS

| | | |
|---|---|---|
| 4,020,452 | 4/1977 | Trouiller et al. . |
| 4,265,305 | 5/1981 | Stone et al. . |
| 4,293,936 | 10/1981 | Cox et al. . |
| 4,302,826 | 11/1981 | Kent et al. ................................ 367/82 |
| 4,636,999 | 1/1987 | Lygas . |
| 4,759,000 | 7/1988 | Reitz . |
| 4,850,450 | 7/1989 | Hoyle et al. . |
| 4,872,526 | 10/1989 | Wignall et al. . |
| 4,964,085 | 10/1990 | Coope et al. . |

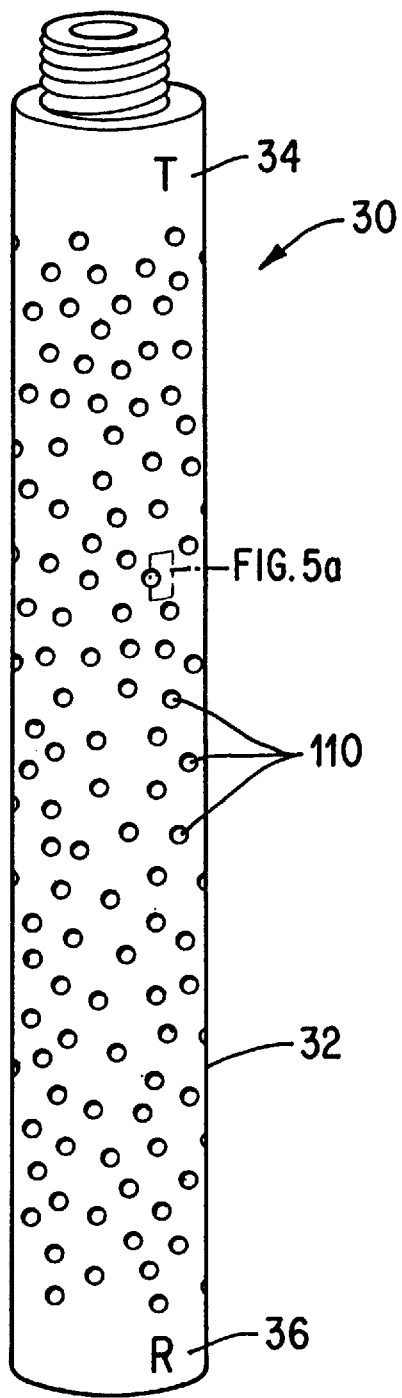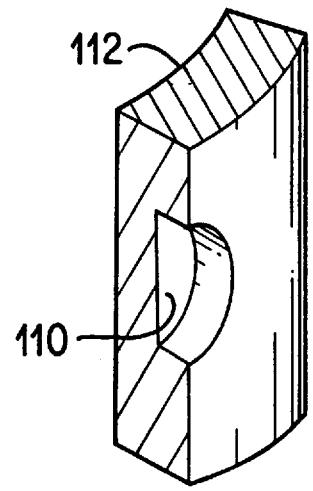
FIG. 5
FIG. 5a

METHOD OF AND APPARATUS FOR SONIC LOGGING WHILE DRILLING A BOREHOLE TRAVERSING AN EARTH FORMATION

CROSS-REFERENCE TO RELATED APPLICATIONS

This application is a Continuation-in-Part of U.S. patent application Ser. No. 07/548,169 filed on Jul. 5, 1990, which was a Continuation-in-Part of U.S. patent application Ser. No. 07/288,742 filed 22 Dec. 1988, now abandoned.

TECHNICAL FIELD

The present invention is directed to exploration and development of sources of hydrocarbons and particularly to such exploration by acoustic investigations of the properties of the formations traversed by a borehole. More specifically, the present invention is directed to an apparatus and method for transmitting an acoustic signal into the formation and for detecting the acoustic signal at a spaced detector after it has propagated through the formation. More particularly, the present invention is directed to methods of and apparatus for performing sonic logging while drilling.

BACKGROUND OF THE INVENTION

As known in the art, three operations occur during the process of drilling a borehole through an earth formation. These operations are typically referred to in the art as tripping in, drilling and tripping out. Tripping in refers to lowering the drill bit in the existing portion of the borehole. Drilling refers to cutting the formation to lengthen, either horizontally or vertically, the existing portion of the borehole. Tripping out refers to pulling the drill bit back to the surface, e.g., to check the bit, to change the bit, or to set casing.

As used herein, the term "logging while drilling" or "LWD" is defined as obtaining logging measurements with apparatus located on either a drill collar or a drill string. These measurements may be obtained while tripping in, tripping out, drilling, or any combination thereof.

After a well has been drilled, a number of wireline logs are ordinarily obtained to reveal certain physical characteristics of the formation. Typically, resistivity, neutron porosity, and gamma ray density investigations, the "Triple Combo", are made to acquire sufficient information to derive values of formation porosity and water saturation. Where additional information is desired, a sonic investigation is sometimes performed in order to obtain another value of porosity, the speed of propagation of sound in the rock and information on the bulk elastic properties of the formation. The information available from the sonic log is then useful in a variety of applications, including well to well correlation, determining porosity, determining the mechanical or elastic parameters of the rock and hence an indication of lithology, detecting overpressured formation zones, and enabling the conversion of a seismic time trace to a depth trace from information acquired on the speed of sound through the formation.

While wireline logs have in the past been the only way to obtain such formation information in situ, recent developments in the oilfield service industry have effected the advent of alternatives to the Triple Combo wireline measurements: namely the resistivity, the neutron porosity, and the gamma ray density measurements performed while drilling: the "LWD Triple Combo". Previously, the oilfield service industry has not developed a "while drilling" alternative to the fourth most commonly used log, the sonic log.

The basic principle of the sonic log is that an acoustic signal is generated at a transmitting transducer, the signal propagates through the formation to at least one receiving transducer, and the first arrival is detected. From knowledge of the time of transmission and the time of the first arrival of acoustic energy at the receiver after having passed through the formation, the time of propagation of the signal through the formation can be determined which is referred to as interval transit time, $\Delta t$. $\Delta t$ may then be used in the Wyllie time-average equation:

$$\Delta t = \Delta t solid(1-\phi) + \Delta t fluid(\phi)$$

to obtain porosity, $\phi$. $\Delta t$solid and $\Delta t$fluid are known from predetermined knowledge of the speed of propagation of sound in various rocks and fluids and by knowing the types of rock and fluid in which the investigation is being made. As an alternative to the Wyllie time average relationship, the more recent "Raymer, Hunt, Gardner" relationship may be utilized.

In order for a sonic tool to be able to detect the first formation arrival, the detected signal is preferably virtually free of energy launched by the transmitter into the tool body which is then propagated along the tool body to the position of the receiver. Since the speed of propagation of sound in the tool body, which is normally steel, can be much higher than that of the formation rock, the tool propagated signal invariably arrives before the formation arrival.

Techniques have been developed in the wireline logging industry for attenuating and/or slowing down the tool propagated signal so that the formation arrival may be detected without much interference from the tool propagated signal. These techniques have focused on creating a "tortuous path" in the sonde housing by incorporating perforations or slots through the sidewall of the tool's housing. See, e.g., the following U.S. Pat. Nos., incorporated herein by reference: 3,191,141 to Schuster; 3,213,415 to Moser et al.; 3,271,733 to Cubberly Jr.; 3,364,463 to Pardue; 3,608,373 to Youmans; 4,020,452 to Trouiller et al.; and 4,850,450 to Hoyle et al.

The prior art has also proposed creating a tortuous path by placing internal and external grooves into the sidewall of the sonde's housing. The internal and external grooves allegedly create an increased path length for the acoustic signal while retaining a constant housing thickness. See, e.g., the following U.S. Pat. Nos., herein incorporated by reference: 3,190,388 to Moser et al.; 3,191,141 to Schuster (FIGS. 21 and 23); 3,191,143 to Pardue; and 3,493,921 to Johns (FIG. 3). Dissimilar materials can be placed in these grooves, as shown in U.S. Pat. No. 3,190,388 to Moser et al.

Other tortuous paths extend the total length between transmitter and receiver, thereby delaying the tool housing signal. See, e.g., the following U.S. Pat. Nos., incorporated herein by reference: 3,191,142 to Lebourg; 3,213,415 to Moser et al.; 3,271,733 to Cubberly Jr.; 3,381,267 to Cubberly Jr. et al. and 3,493,921 to Johns (FIG. 4).

Other prior art acoustic isolating systems include mounting spaced transmitters and receivers either on flexible material, such as rubber, as in U.S. Pat. No. 3,063,035 to Vogel et al., or on a material such as Teflon, whose acoustic velocity is slower than the housing material, as in U.S. Pat. No. 3,144,090 to Mazzagatti et al., both of which are incorporated herein by reference.

The expedient of providing openings or cuts that extend through the side wall thickness of the member is clearly unsatisfactory for a sonic investigation performed from a drill string or drill collar for several reasons. First, in the Logging While Drilling (LWD) environment, the investigating apparatus is incorporated into a drill collar or drill string and therefore must be able to withstand the immense forces and accelerations encountered thereon while drilling the hole. If a significant number of perforations were to be made through the sidewall of the drill collar, the collar would be weakened to the point that the collar would no longer be able to withstand the forces imposed upon it by the drilling process. Second, during drilling, mud is circulated through a drill bit via the drill string including the collars, MWD tools, and LWD tools. The mud is necessary for several reasons, including clearing the debris from the drill bit, as well as maintaining pressure on the formation to insure fluid isolation of independent zones. The pressure differential between the inside and outside of the drill collar is typically several thousand psi. Thus, if perforations or slots were provided in the drill collar, the drilling fluid would simply pass through the slots and into the annulus and never reach the bit.

In theory, an ideal sonic transmitter for compressional wave logging with an LWD tool would excite an azimuthally symmetric (monopole) wave in the surrounding formation and the drill collar itself. However, it has been found that due to various factors such as the tremendous drilling noise created by the drill bit and drill string interacting with the formations, additional waves with other azimuthal behaviors are generated. These additional waves include dipole waves that vary in proportion to $\cos \theta$, and quadropole waves that vary in proportion to $\cos 2\theta$ with $\theta$ being the azimuthal angle in a plane perpendicular to the longitudinal axis of the drill collar. All three types of waves generally contribute to the collar arrival and therefore must be attenuated.

From the above, it is clearly not practical to apply the wireline "tortuous path" technique of delaying tool arrivals to an LWD tool by providing perforations or slots through an LWD drill collar. Yet, it is equally clear that an LWD sonic tool must be provided with some type of means to sufficiently delay and/or attenuate acoustic signals traveling through the collar in order to effectively detect the formation signal while maintaining the physical integrity of the drill collar.

SUMMARY OF THE INVENTION

It has been discovered, through laboratory experiments and mathematical modeling of cylindrical drill collars, that due to the cylindrical geometry of the drill collar, a natural notch or stop band exists for monopole wave propagation at a well defined, predetermined frequency at which the sound propagating in the drill collar is attenuated. This stop band occurs in the vicinity of the frequency of transition of the propagation slowness of the first monopole collar mode from one slowness to another. At this frequency, acoustic energy couples well with the surrounding medium and is subsequently lost to that medium.

It is proposed therefore to take advantage of this natural stop band phenomenon to make a sonic type of measurement in the drilling environment. Accordingly, one object of the present invention is to transmit acoustic energy preferentially at or near the stop band frequency and to detect acoustic energy at or near the stop band frequency as a means of discriminating against the drill collar propagated acoustic signal and of enhancing the detectability of the formation propagated acoustic signal.

In addition, it has been discovered that, having determined the natural stop band frequency, a plurality of axially periodic, substantially circumferentially continuous sections of the drill collar (such as grooves or ridges in the form of circumferential rings or helical threads) with acoustic propagation characteristics different from the drill collar may be provided in such a manner that the acoustic energy at the stop band frequency is further attenuated or filtered through a combination of reflection and destructive interference. A periodically sectioned collar produces both slower and weaker collar arrivals, making the formation arrivals detectable in the stop band of the collar. Such sections may either be circumferential mass loads on the drill collar or circumferential grooves cut into the thickness of the sidewall of the drill collar. These sections may be formed alternatively on the interior or the exterior of the drill collar and may be circular or helical.

It has further been discovered that a suitable arrangement of these circumferentially continuous grooves or ridges may be fashioned such that they also substantially filter or attenuate dipole and/or quadrupole collar waves in their respective stop bands. In addition, the circumferential grooves or ridges may be arranged such that their filtering and/or attenuation properties for monopole, dipole, and quadrupole modes do not interfere with one another. In addition, the circumferential grooves or ridges create substantially overlapping stop band attenuation notches for the three modes.

A further measure found to be beneficial in preventing the interfering propagation of acoustic energy along the length of the drill collar includes mounting both the acoustic transmitter and the acoustic receiver in acoustic isolation from the drill collar. Preferably, the transmitter and receiver are oriented transversely to the longitudinal axis of the drill collar so as to preferentially launch the acoustic signal toward the formation rather than along the length of the drill collar.

BRIEF DESCRIPTION OF THE DRAWINGS

FIG. 5 is an illustration of a drill collar with randomly positioned depressions extending into the material of the drill collar by a fraction of the thickness of the drill collar.

FIG. 5a is an enlarged view of a section of the drill collar of FIG. 5 illustrating one of the depressions therein.

FIG. 6b is a plot of amplitude versus frequency of the monopole, dipole, and quadropole modes for the drill collar illustrated in FIG. 3a.

DESCRIPTION OF THE PREFERRED EMBODIMENT(S)

Figure 1:
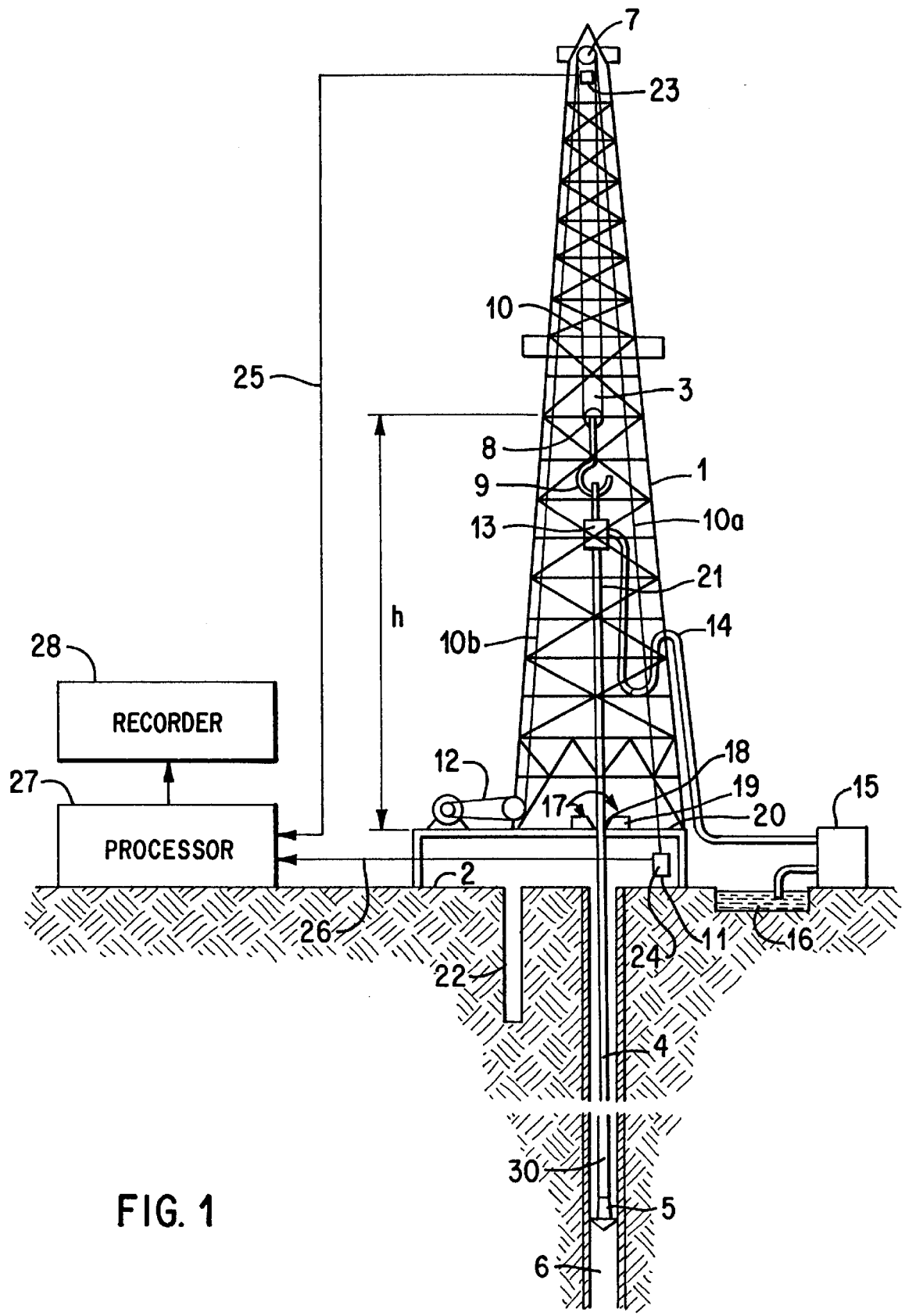
FIG. 1 is a general illustration of a drilling rig and the drill string with a downhole acoustic logging tool of the present invention incorporated into the drill string.

FIG. 1 is a general illustration of a drilling rig and the drill string with a downhole acoustic logging tool of the present invention in the borehole. The rotary drilling rig shown comprises mast 1 rising above ground 2 which is fitted with lifting gear 3 from which is suspended drill string 4 formed of drill pipes screwed one to another and having at its lower end drill bit 5 for the purpose of drilling well 6. Lifting gear 3 consists of crown block 7, the axis of which is fixed to the top of mast 1, vertically travelling block 8, to which is attached hook 9, cable 10 passing round blocks 7 and 8 and forming, from crown block 7, on one hand dead line 10a anchored to fixed point 11 and on the other active line 10b which winds round the drum of winch 12.

Drill string 4 is suspended from hook 9 by means of swivel 13 linked by hose 14 to mud pump 15, which permits the injection of drilling mud into well 6, via the hollow pipes of drill string 4. The drilling mud may be drawn from mud pit 16 which may be fed with surplus mud from well 6. The drill string may be elevated by turning lifting gear 3 with winch 12 and the drill pipes may be successively removed from (or added to) well 6 and unscrewed in order to remove bit 5. These drill pipe raising and lowering operations require drill string 4 to be temporarily unhooked from lifting gear 3; the former is then supported by blocking it with wedges 17 in conical recess 18 in rotating table 19 mounted on platform 20 through which the drill string passes. The lowermost portion of the drill string may contain one or more tools, as shown at 30 for investigating downhole drilling conditions or for investigating the properties of the geological formations penetrated by the bit and borehole 6. Tool 30 shown is an acoustic logging tool of the present invention having at least one transmitter and a plurality of receivers spaced therefrom.

Variations in height h of travelling block 8 during drill string raising operations are measured by means of sensor 23 which may be an angle of rotation sensor coupled to the faster pulley of crown block 7. Weight F applied to hook 9 of travelling block 8 may also be measured by means of strain gauge 24 inserted into dead line 10a of cable 10 to measure its tension. Sensors 23 and 24 are connected by lines 25 and 26 to processing unit 27 which processes the measurement signals and which incorporates a clock. Recorder 28 is connected to processing unit 27, which is preferably a computer.

Figure 2:
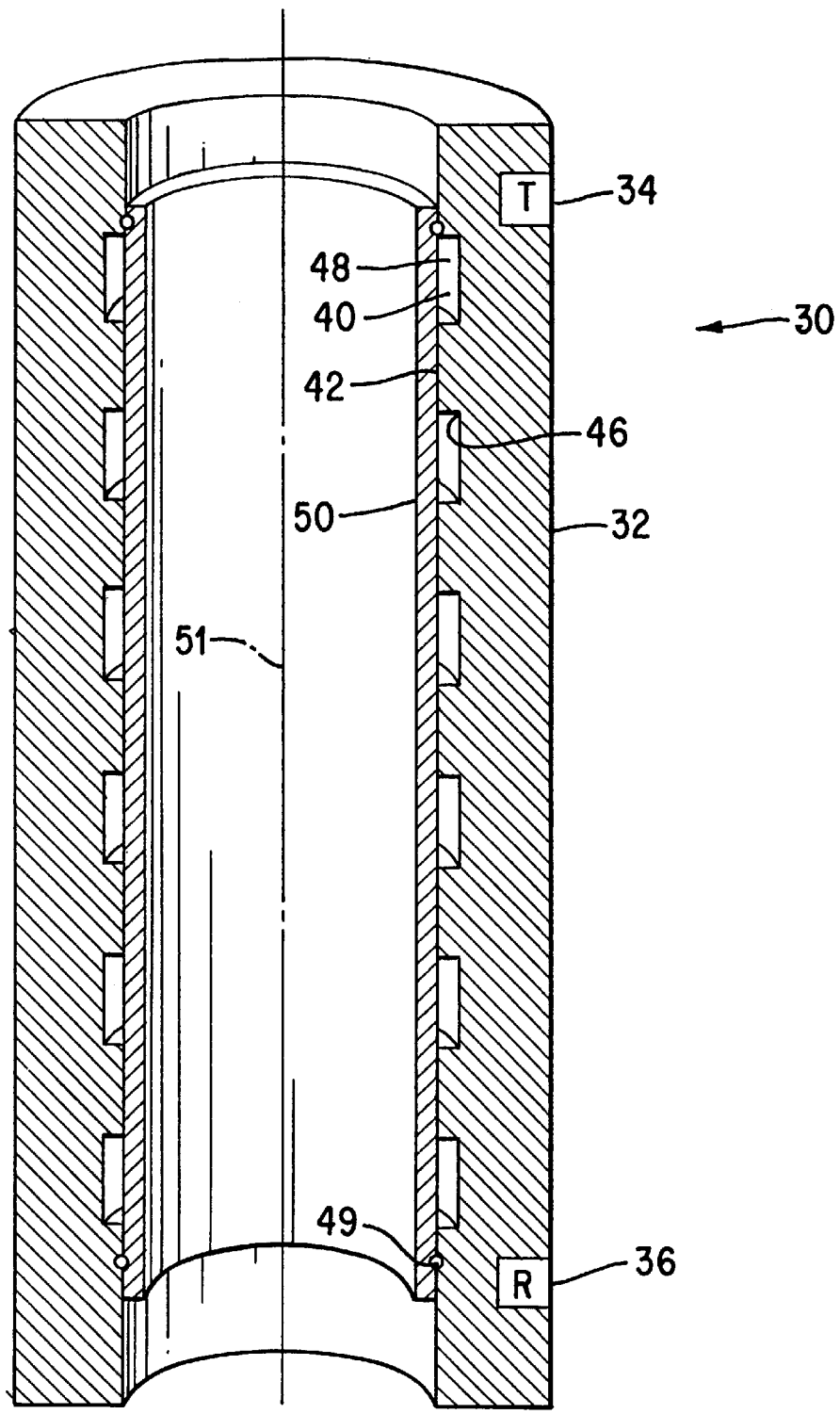
FIG. 2 is a schematic half cross-section of a periodically grooved drill collar of the present invention with internal grooves.

Turning now to FIG. 2, the basic components of sonic logging tool 30 of the present invention are schematically illustrated. As in most measurement while drilling operations, the tool is formed in a longitudinally extending body adapted for positioning in the borehole. In the drilling environment, this body is typically heavy walled drill collar 32 which is basically a thick walled cylinder (only a portion of which has been shown) with longitudinal central axis 51. Mounted on the drill collar are acoustic transmitter 34 and acoustic receiver 36 spaced therefrom. While only one receiver has been shown in FIGS. 2 and 3, it is to be understood that it may be preferable to include an array of receivers (as shown in FIG. 1) and possibly more than one transmitter for performing a borehole compensated sonic investigation. It should also be understood that the Figures are not necessarily drawn to scale. For example, in practice, the distance between transmitter 34 and receiver 36 and the number of grooves are much greater than shown.

Figure 4:
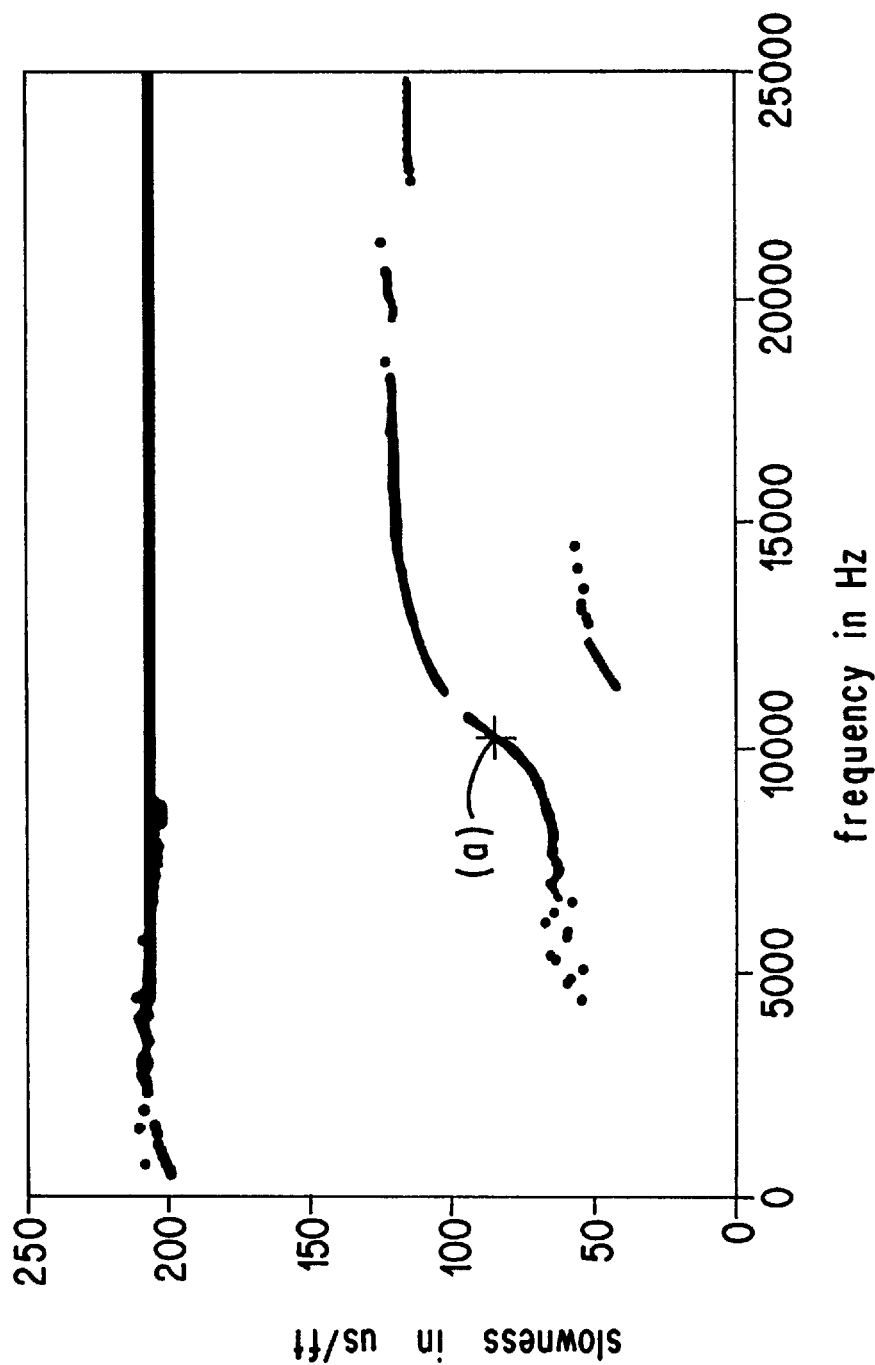
FIG. 4 is a plot of the acoustic propagation slowness for a tubular drill collar versus frequency illustrating transition regions from smaller slowness to larger slownesses.

It has been found that a member such as heavy walled drill collar 32 supports a number of guided acoustic modes with slowness transition regions. As an illustrative example, a plot of slowness versus frequency for the first monopole mode is shown in FIG. 4. For a typical smooth drill collar having an 8.5 inch outside diameter and a 4 inch inside diameter, the first mode slowness changes from about 60 $\mu$s/ft below 9 kHz to about 150 $\mu$s/ft above 12 kHz. The center transition frequency (point a, FIG. 4) occurs at about 10 kHz.

A second and a third center transition frequency (not shown) occurs at about 17 kHz and above about 22 kHz, respectively, corresponding to slowness transition regions in the second and third guided propagation acoustic modes of the drill collar. It is to be noted that these slowness transition regions are dependent upon drill collar dimensions.

In this example, the first mode is highly attenuative at about 10 kHz because the collar vibrations couple very well to the fluid at that frequency. Thus, acoustic stop bands exist at the frequencies of the transition regions at which acoustic coupling into the surrounding medium is enhanced.

The center transition frequency is estimated by the present invention as the frequency, $f_c$, at which the wavelength of the extensional wave is equal to the mean circumference of the collar. That is:

$$f_c = kV/(d1+d2)$$

where k is equal to $2n/\pi$;

n represents the ratio of the center transition frequency of the mode in question to the center transition frequency of the first mode;

V is the bar extensional wave velocity of the collar, d1 is the inner diameter of the collar, and d2 is the outer diameter of the collar.

In the above example, n is equal to 1 for the center transition frequency of the first mode, n is equal to 1.7 for the center transition frequency of the second mode, and n is at least equal to about 2.2 for the center transition frequency of the third mode. Depending on the properties of the materials from which the drill collar is fabricated and its size, the center transition frequency may lie in the range of from about 3 to about 30 kHz.

Accordingly, advantage is taken of the stop band (or notch) by providing transmitters and receivers which operate in the region of the stop band frequencies. In this manner, acoustic energy propagating in the drill collar at the stop band frequency is attenuated, giving receiver 36 an opportunity to detect the energy that is launched into and propagated along the geological formation adjacent to tool 30.

While attenuation of the smooth collar propagated signal at the stop band frequency, in some circumstances, may be sufficient for the receiving detector to acquire a reasonable formation signal, it is still possible to further enhance the effectiveness of the notch of the stop band by providing the drill collar with means intermediate the transmitter and receiver for causing further acoustic attenuation at the predetermined frequency of the stop band. Referring back to FIGS. 2 and 3, this may be done by providing the drill collar with axially discontinuous, substantially circumferentially continuous portions 48 having acoustic propagation characteristics different from those of the drill collar material itself. As used herein, the term "axially discontinuous, substantially circumferentially continuous portion" is intended to include not only a circumferential ring or band that winds continuously around the drill collar, but also where the rings or bands extend all the way around the drill collar except for a portion small relative to the drill collar circumference so long as the desirable acoustic effects of enhancing the stop band is obtained.

Portions 48 act primarily as reflectors that cause the acoustic energy to reflect back in the opposite direction. Preferably, such portions have sides facing in the axial direction that are substantially normal to the longitudinal axis of the drill collar. Additionally, it has been discovered that a periodically spaced array of such portions, at the right spacing, may act as a means for not only reflecting and scattering the collar propagating acoustic energy but also for creating destructive wave interference which further reduces the amplitude of the acoustic signal within the stop band.

Such portions are illustrated in FIG. 2 as rectangular grooves 40 separated by ridges or flats 42 that have preferably been formed on the interior surface of drill collar 32. Formation of grooves 40 on the interior of the drill collar has a number of advantages compared to the exterior of the collar, including protection from abrasive contact with the borehole wall, a stronger and more rigid drill collar, as much as 50% reduction in stress concentrations, and the ability for the groove to have square corners as opposed to rounded corners.

The portions (spaces) 48 are preferably provided with the maximum attainable difference in acoustic propagation properties relative to those of the material of the drill collar. Alternatively, the material of the portions may be selected such that its speed of propagation of sound closely matches that of the drilling fluid so that a minimum of energy is reflected back into the drill collar from the interface between the material of the portion and the drilling fluid. Spaces 48 may be filled with, e.g., epoxy, rubber, air, oil or other suitable material. In the preferred embodiment, the material is air or oil, and is maintained by sleeve 50 which serves to trap the air or oil and to isolate it from the drilling fluid circulating on the inside of collar 32. In a preferred embodiment, sleeve 50 is isolated from collar 32 by a gasket, e.g., rubber (not shown). Measures may be taken to hydraulically seal the ends of sleeve 50 with, for example, elastomer O-rings 49 which also serve to provide an acoustic impedance to the energy launched by the transmitter.

Figure 3:
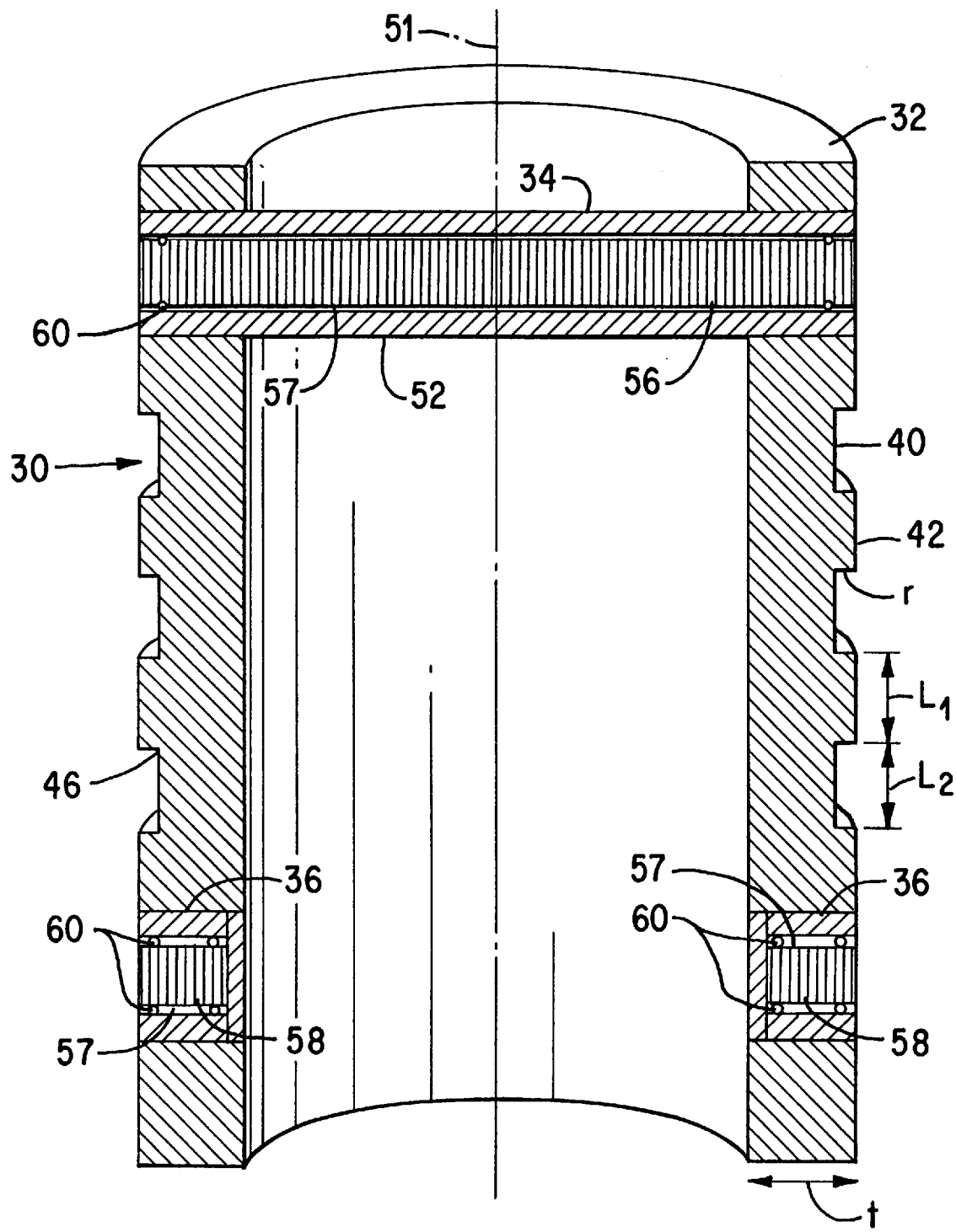
FIG. 3 is a schematic half cross-section of a periodically grooved drill collar of the present invention with external grooves and a transversely mounted transmitter and receiver.

Interior corners of grooves 40 are indicated at 46. Where grooves 40 are formed on the exterior of the drill collar (as illustrated in FIG. 3), interior corners 46 are preferably rounded in order to minimize the stress concentrations created by the formation of the groves. Where grooves 40 are formed on the interior of the drill collar (as illustrated in FIG. 2) where stress concentration is not as great a concern, their interior corners are preferably as square as possible in order to maximize the amount of acoustic signal reflected by the collar/groove interface.

Turning now to FIG. 3, another embodiment is illustrated. As shown, grooves 40 have been formed on the exterior surface of drill collar 32 and would be either empty (filled with the drilling mud) or filled with epoxy, fiberglass or some other material having significant resistance to the abrasion expected through contact with the borehole wall during the drilling process. Grooves 40 are shown as having depths "r" and widths in the longitudinal direction "L2". Groves 40 are separated by ridges or flats 42 having widths "L1". Generally, the widths L2, (and axial spacings, L1 which may preferably be equal to L2) of the grooves may be determined in accordance with the following relationship:

$$L1 = L2 = \tfrac{1}{4} f S$$

where
- L1 represents the spacing between the grooves;
- L2 represents the axial length of the groove;
- f represents the predetermined frequency; and
- S the slowness of an acoustic wave propagating in said body.

The thickness of the sidewall of drill collar 32 is indicated by "t" and is determined to satisfy both the attenuation requirement necessary to successfully detect the formation arrival and a drill collar strength requirement. In one example, drill collar 32 may have an internal diameter of 4 inches (10.2 cm), and an external diameter of 8.5 inches (21.6 cm) so that the thickness, t, of the drill collar is 2.25 inches (5.7 cm). In this situation, grooves 40 may have a depth r of 1.2 inches (3.05 cm) and widths L2 of 5 inches (12.7 cm) which is also the width L1 of flat portion 42. The above listed dimensions have been found to be satisfactory from both acoustic and mechanical perspectives. The further the separation between transmitter 34 and receiver 36, the better the attenuation of the collar propagated signal. A separation distance of 11 feet (3.35 m) has been found to be satisfactory in most conditions to enable the detection of a reasonable formation arrival.

Figure 3A:
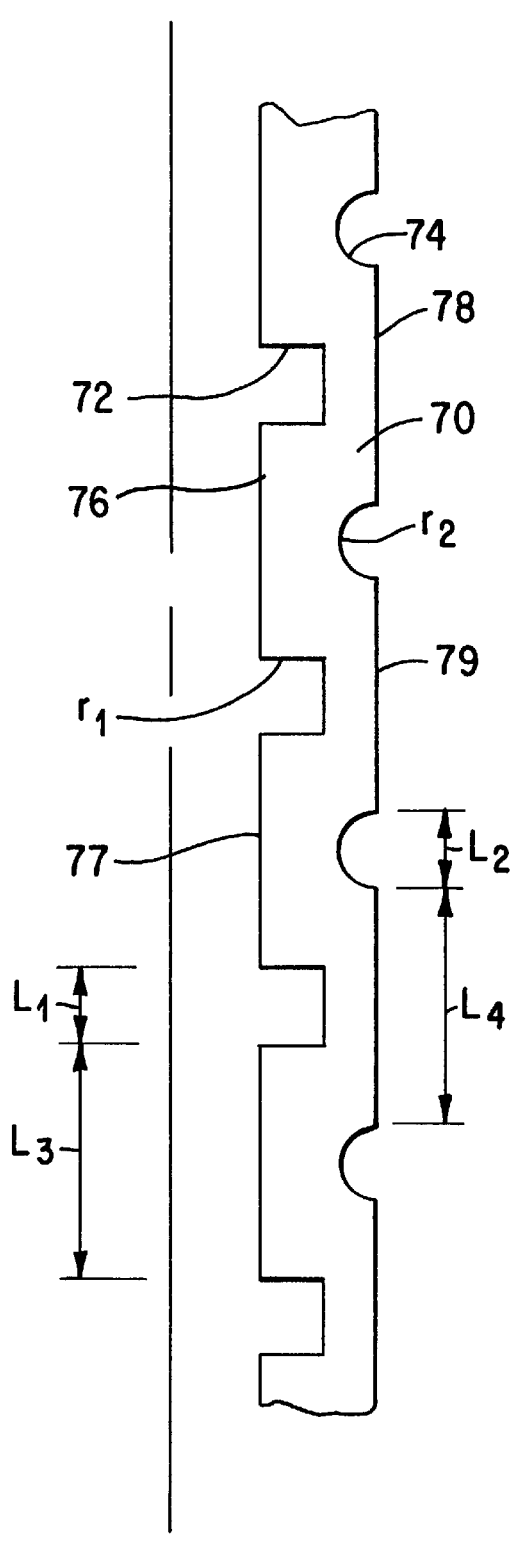
FIG. 3a is a schematic partial cross-section of the outer wall of one embodiment of a periodically grooved drill collar of the present invention having both internal and external grooves.

While it has been found that the collars provided with stop band filters illustrated in FIGS. 2 and 3 are effective in attenuating monopole forms of acoustic energy traveling within the collar, the filter is not as effective in attenuating other modes such as dipole and quadropole generated, for example, by drilling noise and nonperfectly symmetric transmitters. Accordingly, FIG. 3a illustrates another preferred embodiment of the present invention for creating a more effective acoustic stop band filter within a drill collar. In FIG. 3a, grooves 72 and outer grooves 74 are formed on both the inside and outside surfaces 76 and 78, respectively, of drill collar 70. Grooves 72 and 74 are preferably staggered, i.e. radially misaligned, so as to maintain a minimum wall thickness and thereby provide collar 70 with sufficient strength and rigidity to survive the drilling process. It has been found that monopole and quadropole acoustic waves are sufficiently attenuated when, for an 8.25 inch (21.0 cm) O.D. and 4.0 inch (10.2 cm) I.D. drill collar, the depth $r_1$ and length $L_1$ of inner grooves 72 are 1.2 inches (3.0 cm) and 1.6 inches (4.1 cm), respectively, while the depth $r_2$ and length $L_2$ of outer grooves 74 are 0.75 inches (1.2 cm) and 1.6 inches (4.1 cm), respectively, with $L_3$ and $L_4$ of flat portions 77 and 79, respectively, both being 4.8 inches (12.2 cm), resulting in a period for both inner and outer groove patterns of 6.4 inches (16.3 cm). It has been found that the rapid increase in monopole mode slowness with frequency above the transition frequency requires this short period for effective attenuation in this frequency region.

Figure 3B:
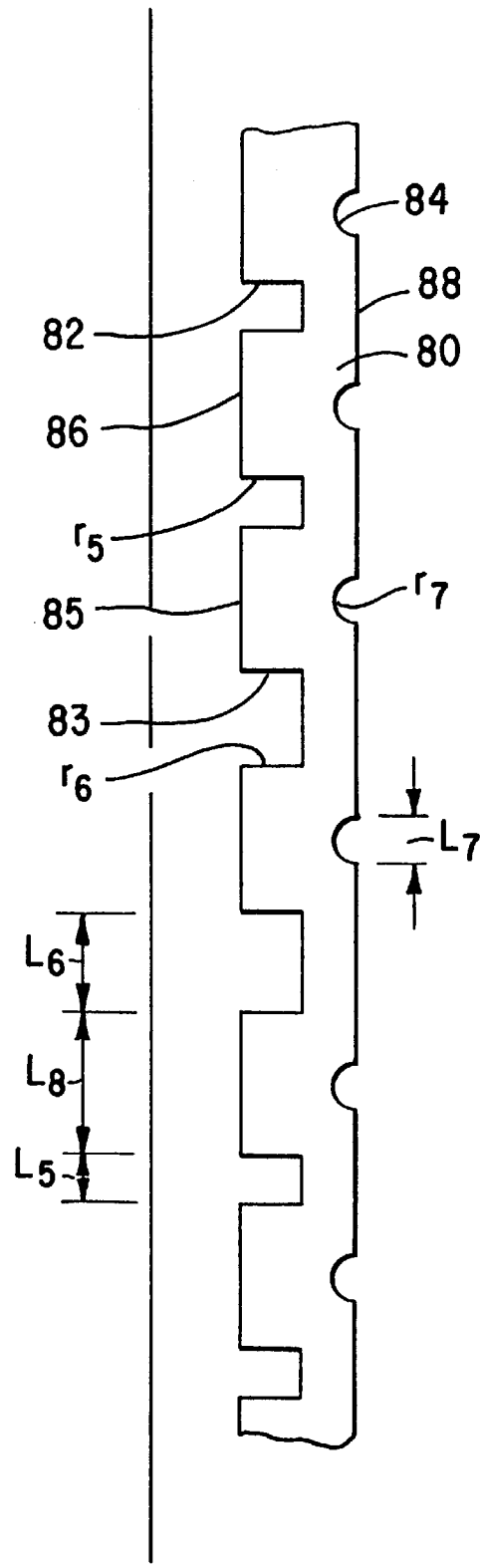
FIG. 3b is a schematic partial cross-section of the outer wall of another embodiment of a periodically grooved drill collar of the present invention having both internal and external grooves.

FIG. 3b illustrates yet another preferred embodiment of the present invention for creating an effective accoustic stop band filter within a drill collar. In FIG. 3b, a plurality of small inner grooves 82, large inner grooves 83, and outer grooves 84 are formed in both the inside and outside surfaces 86 and 88, respectively, of drill collar 80. Inner grooves 82 and 83 and outer grooves 84 are also preferably radially misaligned to maintain a minimum wall thickness. In this embodiment, it has been found that monopole, dipole, and quadropole acoustic waves are effectively attenuated when, for an 8.25 inch (21.0 cm) O.D. and 4.0 inch (10.2 cm) I.D. collar, the depth $r_5$ and length $L_5$ of small inner grooves 82 are 1.2 inches (3.0 cm) and 1.0 inches (2.5 cm), respectively; the depth $r_6$ and length $L_6$ of large inner grooves 83 are 1.2 inches (3.0 cm) and 2.0 inches (5.1 cm), respectively; and depth $r_7$ and length $L_7$ are 0.6 inches (1.5 cm) and 1.0 inches (2.5 cm), respectively with flat portion 85 between inner grooves 82 and 83 has a length $L_8$ of 3.0 inches (7.6 cm), thereby yielding a mixture of 4 inch (10.2 cm) and 5 inch (12.7 cm) periods. Outer grooves 84 are spaced such that they preferably fall in the middle of flat portions 85, thereby also yielding a mixture of 4 inch (10.2 cm) and 5 inch (12.7 cm) periods.

FIG. 5 illustrates another embodiment of the present invention for forming an acoustic stop band on a drill collar. In this embodiment, the means for producing a stop band are not circumferentially continuous portions but rather are depressions 110 formed in the surface (exterior or interior) of the drill collar at random locations. In the specific example illustrated and that has been tested experimentally with a one tenth scale model, depressions 110 comprise holes (filled or unfilled as described above with regards to grooves 40) with diameters and depths of one tenth of an inch. The side wall of the one tenth scale model is comprised of material 112 with a thickness of 0.15 inches. Unlike the case of the wireline sonde having holes which are uniformly spaced, are formed entirely through the sonde housing and which attenuate acoustic energy all along the spectrum, depressions 70 enhance the naturally occurring stop band (with a limited frequency range) of the drill collar.

Figure 6:
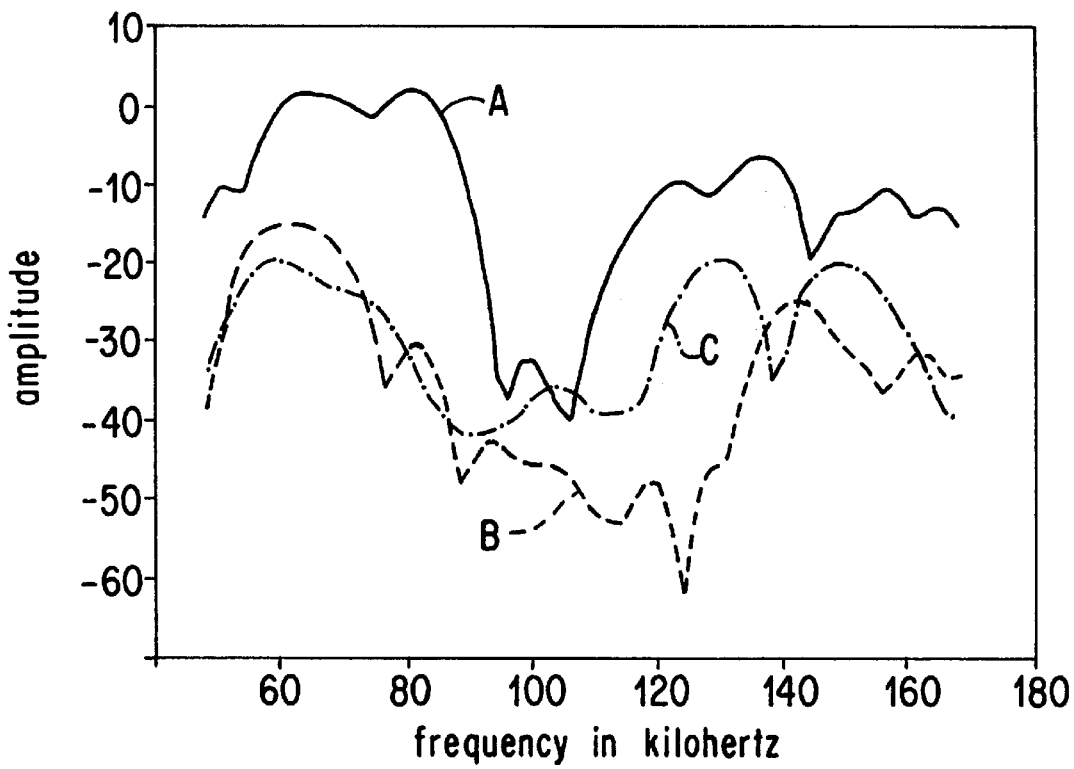
FIG. 6 is a plot of amplitude versus frequency for a variety of samples of drill collars including a smooth drill collar, a drill collar having circumferential grooves, and a drill collar having randomly positioned depressions.

FIG. 6 is a representation of the frequency spectra of experimental data derived from three one tenth scale models using a ring source and a ring receiver. The one tenth scale drill collars used in the experiment had internal diameters of 0.5 inches and outside diameters of 0.8 inches. In FIG. 6, curve A represents the spectrum of a smooth drill collar, curve B represents the spectrum of a drill collar having circumferential exterior grooves through 40% of the thickness of the drill collar, and curve C represents the spectrum of a drill collar having random circular depressions through 67% of the thickness of the drill collar.

As can be seen, the attenuation spectrum of curve A shows a natural stop band at approximately 100 kHz (which is equivalent to about 10 kHz at full scale) with a band width of approximately 20 kHz (2 kHz full scale). As can be seen from curve B, the addition of external grooves not only deepens the stop band but widens it. Curve C, the curve from a one tenth scale drill collar having randomly positioned circular depressions, has a stop band that has been broadened with some deepening relative to the smooth collar stop band of curve A. It is expected that a drill collar having depressions with a range of diameters would exhibit further broadening of the stop band of curve C. Other combinations of internal and/or external grooves and/or random depressions of the same or different sizes can be utilized to produce other desirable variations. As will be realized by those skilled in the art, dimensions and frequencies for full size drill collars having the features of the models of FIG. 6 may be obtained by applying the scale factor of 10.

Figure 6A:
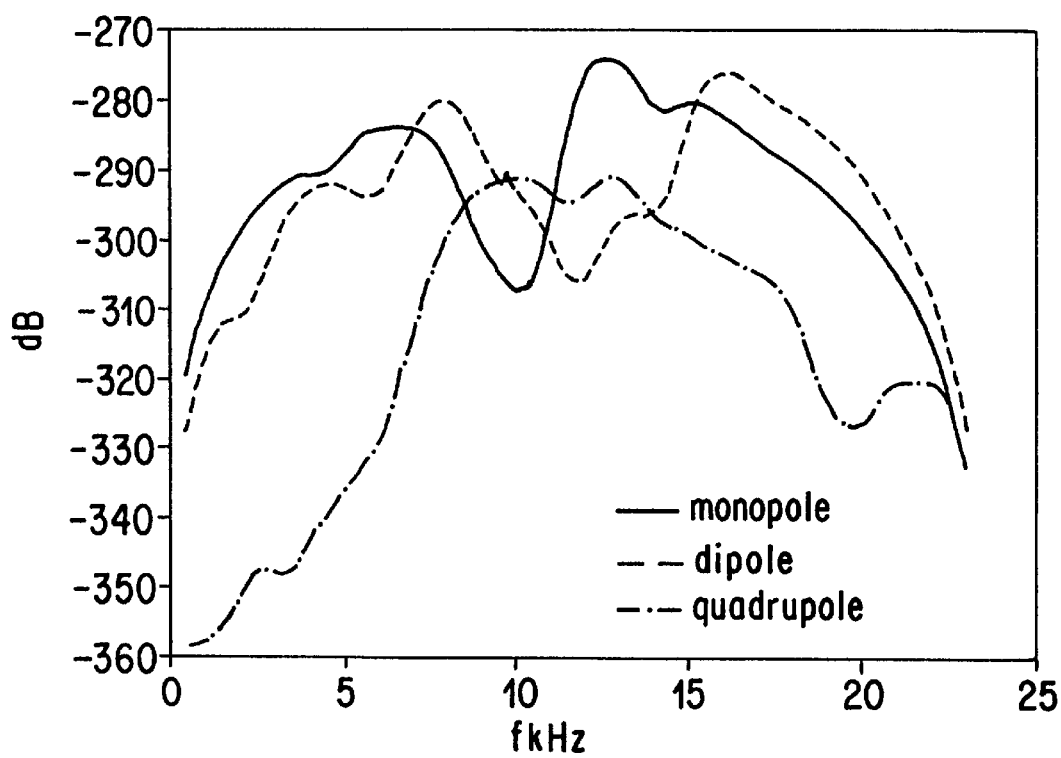
FIG. 6a is a plot of amplitude versus frequency of the monopole, dipole, and quadrupole modes for a smooth drill collar.

FIG. 6a is a representation of the frequency spectra of the waveform of a smooth 8.5 inch×4.0 inch (21.6 cm×10.2 cm) drill collar. As can be seen in FIG. 6a, the collar exhibits a relatively deep monopole natural stop band or notch centered at about 10 Kz while both the dipole and quadropole signals show very little attenuation at this frequency.

Figure 6B:
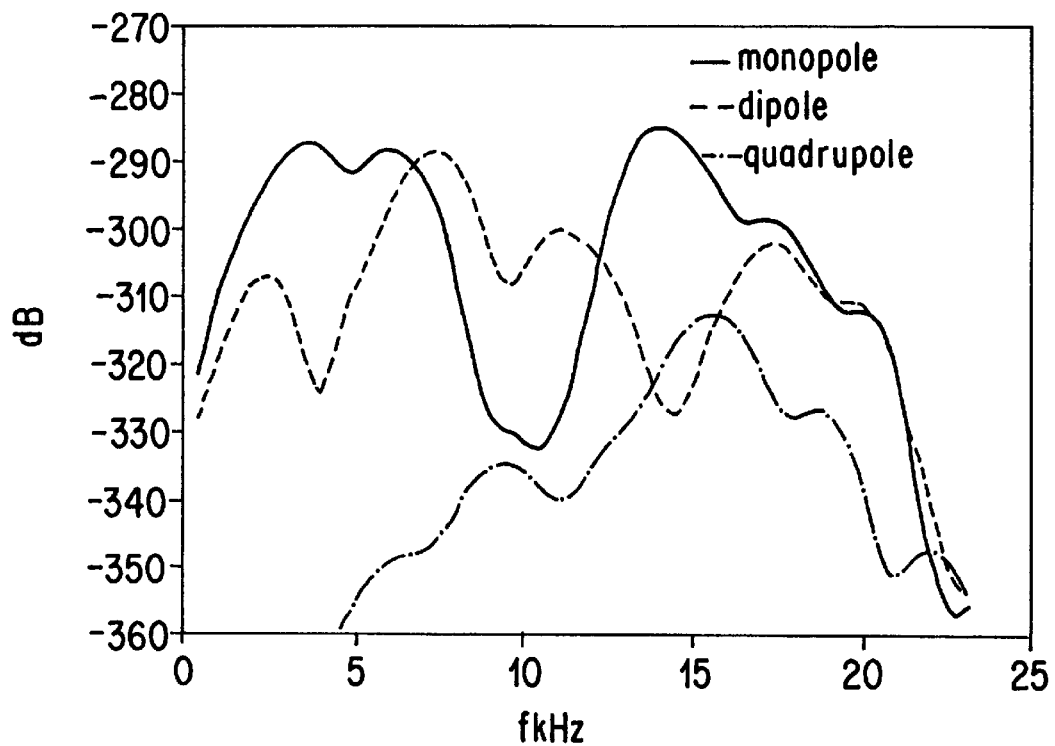

FIG. 6b is a representation of the frequency spectra of the waveform from a collar provided with the stop band filter of the present invention shown in FIG. 3a. The monopole attenuation notch is centered on 10 kHz and is about 3.8 kHz wide at the half-minimum points. As compared to the waveform of FIG. 6a, the dipole curve in this frequency only shows a slight improvement in attenuation. However, the quadrupole attenuation is substantial.

Figure 6C:
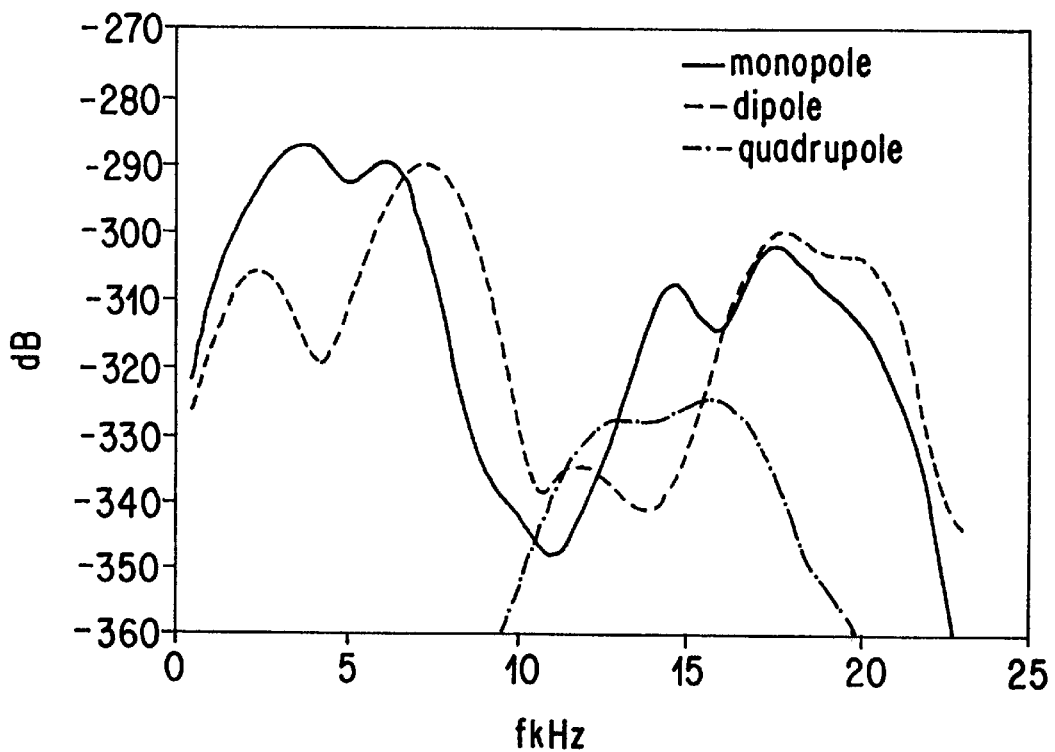
FIG. 6c is a plot of amplitude versus frequency of the monopole, dipole, and quadropole modes for the drill collar illustrated in FIG. 3b.

FIG. 6c is a representation of the frequency spectra of the waveform from a collar provided with the stop band filter of the present invention shown in FIG. 3b. In FIG. 6c, the dipole notch is about as deep as the monopole notch and the frequency band of overlap is about 3.5 kHz centered at about 11.5 kHz, thus providing an excellent overlap of the two attenuation notches. Depending on the relative amplitudes of monopole and dipole collar excitation with a given transmitter design, the center frequency and band width of the pulse can be adjusted to minimize the most troublesome component; slightly lower frequencies favor monopole attenuation, while slightly higher frequencies favor dipole attenuation. Quadrupole attenuation again remains excellent.

Receiver sensitivity to dipole arrivals can be further reduced by summing pairs of matched receivers located at diametrically opposed positions and with the axis between them aligned with that of the transmitter stack. Similarly, dipole and quadrupole arrivals can be simultaneously reduced by summing four receivers arranged at 90° intervals.

Returning to FIG. 3, there is shown one possible design of transmitter 34 and receiver 36 and their mounting arrangement. It is a desirable expedient to minimize the acoustic coupling between the transmitter and the drill collar so that the signal propagated by the collar starts as small as possible. Thus, the transmitter is preferably mounted transverse to the longitudinal axis of the drill collar. Ideally, then, a minimum of acoustic energy is launched into the drill collar and a maximum amount of the energy is launched into the geological formation.

As can be seen from FIG. 3, transducers 56 and 58 are generally cylindrical in shape. Preferably, transducer 56 acting as the transmitter functions in the range of 3–30 kHz. Transducers may comprise a series of stacked disks of piezoelectric material which are electrically driven to vibrate or resonate in unison. The stack of disks may include mass loads (not shown) at one or both ends in order to tune their resonant frequencies to the stop band frequency of the drill collar. In the preferred embodiment, transmitter 34 is a narrow band transducer emitting a majority of its signal at the frequency of the stop band of the drill collar while receiver 36 is a broader band transducer spanning the stop band of the drill collar. The broader band of the receiver enables a maximum amount of acoustic energy to be received from the adjacent formation after having traveled through the formation from transmitter 34.

Transducer 56 may be mounted in the drill collar in transversely extending tube 52. Tube 52 serves to physically isolate and seal the transducer from the drilling fluid on the interior of tool 30. Transducer 56 (and 58) may be acoustically isolated from its mounting tube 52 by means of resilient O-rings 60 which produce air (or fluid filled) gap 57 between the transducer and the sides of tube 52. Additional acoustic isolation may be achieved between the transducers and the drill collar by resiliently mounting the tube in the collar (not shown).

Transmitter 34 has been illustrated as comprising a single transducer extending the width of the drill collar while the receiver has been illustrated as comprising a pair of transducers 58, one at opposite sides of the drill collar. Is should be apparent, however, that both the transmitter and receiver may be of either design. Where the transmitter (or receiver) comprises a pair of transducers, it may be operated in either a monopole (point source) or a dipole (point force) mode.

While drill collars having internal and external portions formed in them for producing acoustic attenuation in a stop band have been described, other means may be found to achieve similar results. For example, rather than machining grooves in the material of the drill collar, it might be found preferable to provide portions which comprise mass loads by fixing bands of material on the exterior or interior of the drill collar. The bands may be affixed to the drill collar by means of heat shrinking or by hot winding a helical strip to the exterior of the collar.

As stated above with reference to FIG. 4, a drill collar acts as a waveguide which conducts several acoustic modes. For each mode, sound travels therethrough at all times, with lower frequencies arriving relatively early and higher frequencies arriving relatively later. However, it has been discovered that a transition frequency range exists whereat acoustic energy propagating in this transition frequency range is radiated into the surrounding wellbore fluid, e.g., mud. It has also been discovered that the range of the transition frequency is dependent upon the dimensions of the drill collar. The center frequency of this range is estimated to be as follows:

$$f_c = \frac{kV}{d_1 + d_2}$$

where k equals $2/n\pi$;

n represents the ratio of the center transition frequency of the mode in question to the center transition frequency of the first mode;

V represents the bar extensional wave velocity of the drill collar, defined as the square root of Young's Modulus over the density of the drill collar (steel);

$d_1$ represents the inner diameter of the drill collar; and $d_2$ represents the outer diameter of the drill collar.

Thus, by locating an acoustic source and receivers in a drill collar and operating them in a relatively narrow band of frequencies defined by the drill collar's transition frequency range, the natural stop band properties of the drill collar can be advantageously employed.

As explained previously, the prior art teaches perforating, i.e., puncturing, a sonde housing in order to attenuate tool arrivals. Although this technique is adequate for conventional wireline applications, perforating a drill collar is not feasible in the logging while drilling environment. For example, perforating a drill collar would render the drill collar structurally inadequate to withstand the forces imposed thereupon by the drilling process, and also destroy the collar's ability to transmit high pressure drilling fluid to the drill bit.

The inventors of the present invention have noted that a drill collar comprising grooves or other depressions therein, yet which do not fully perforate the drill collar, produces a stop band filter which attenuates signals traveling therethrough in a predetermined frequency band. More importantly, such grooves or depressions do not adversely affect the structural integrity of the drill collar.

As used herein, the term "imperforate stop band filter" is defined as a plurality of grooves or other depressions which do not perforate the drill collar, and which cause the energy transmitted through the drill collar between the transmitter and receiver to be substantially attenuated within a predetermined frequency band. The prefix "imperforate" is chosen to emphasis the fact that the grooves or other depressions do not destroy the fluid isolation established by a nonperforated drill collar.

As known in the art, the wavelength, $\lambda$, is defined as velocity over frequency. Written in terms of slowness, where slowness is defined as the inverse of velocity:

$$\lambda = 1/(fS)$$

where f represents frequency; and

S represents slowness of the drill collar sound wave.

The imperforate stop band filter preferably acts as a half-wavelength attenuator. Thus, twice the period of the filter equals the wavelength. Defining the period as the spacing between adjacent grooves or other depressions, L1, and the width of each groove or other depressions, L2:

$$\lambda/2 = L1 + L2$$

Combining the above two previous equations:

$$L1 + L2 = 1/(2fS)$$

In the preferred embodiment, L1 equals L2. Thus the equation:

$$L1 = L2 = 1/(4fS)$$

In the present invention, the imperforate stop band filter preferably comprises periodically spaced grooves placed on the interior wall of the drill collar, and are preferably located the full 360 degrees around the drill collar. Other embodiments can also be chosen, for example, non-periodic grooves, grooves which do not fully traverse the circumference of the drill collar, a helical shaped groove, or random depressions. It is preferable to locate the grooves or other depressions on the interior surface of the drill collar. Alternatively, the grooves or other depressions can be located on the exterior surface thereof, optionally including a sleeve placed about the drill collar, at least over the grooves or other depressions, e.g., to increase the structural integrity of the drill collar and/or to allow the grooves to be filled with a dissimilar fluid such as air.

An imperforate stop band filter can be designed for virtually any frequency band. In the present invention, the inventors have designed the imperforate stop band filter about the frequency range of the natural stop band of the drill collar. In this way, the natural stop band of the drill collar is improved.

For example, in a smooth collar having an 8 inch OD and a 4 inch ID, a natural stop band exists at about 9 to 11 kHz. Providing 0.6 inch deep external grooves extends the stop band to about 8.5 to 13 kHz. Providing 1.0 inch deep grooves extends the stop band even farther, to about 6 to 13 kHz. Given a drill collar of 8.4 inch OD, 4 inch ID, the smooth drill collar's natural stop band of about 9.5 to 11.5 kHz was extended to about 6.5 to 14 kHz with the addition of 1.2 inch deep internal grooves. In these examples, L1 equals L2 equals 5 inches.

Figure 7:
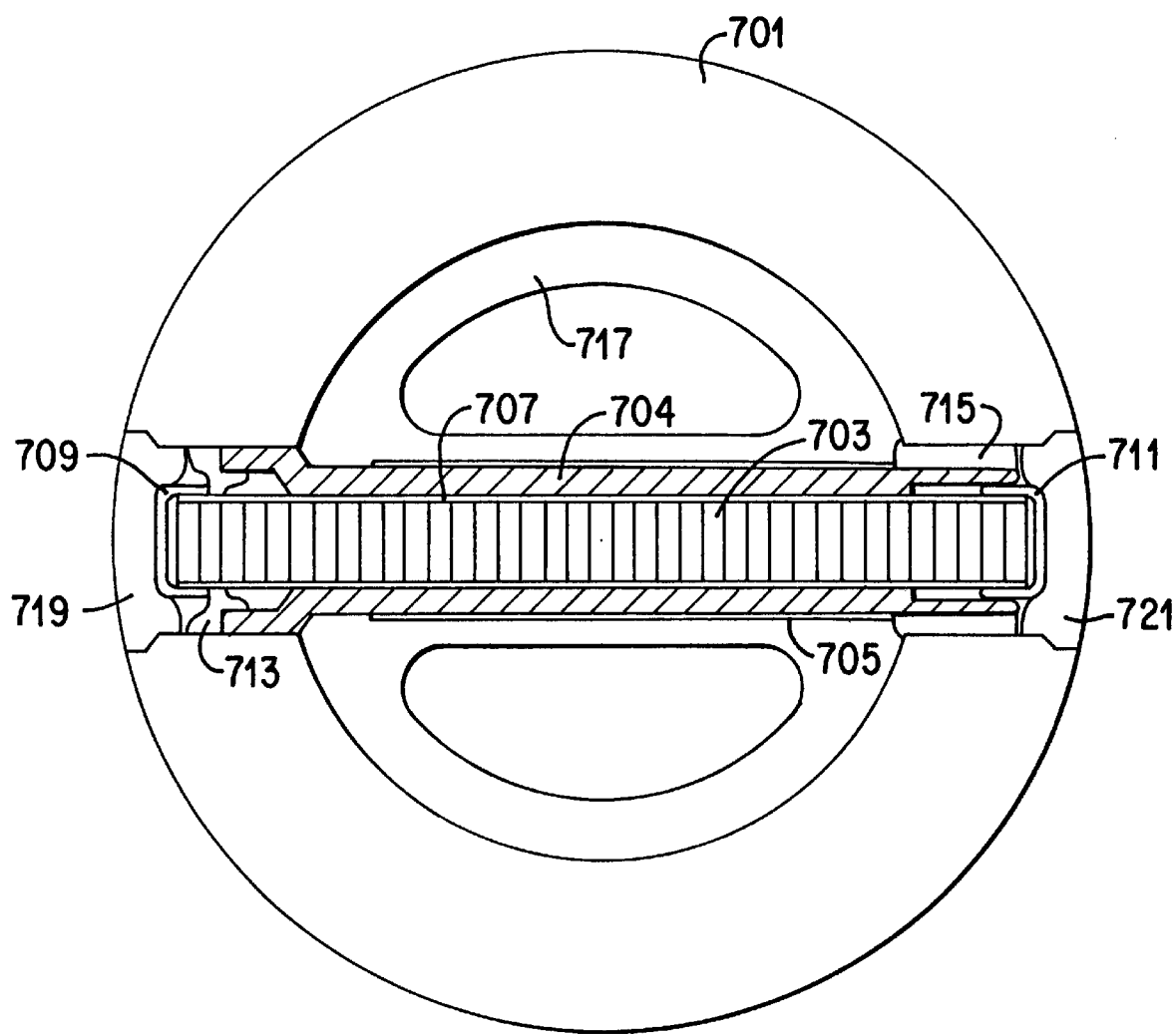
FIG. 7 shows a cross-sectional view of a drill collar through a preferred embodiment of the transducer assembly of the present invention.

Turning now to FIG. 7, a cross-sectional view of the drill collar through a preferred embodiment of the acoustic transducer of the present invention is illustrated. Drill collar 701 houses transversely mounted transmitter 703, steel housing 704, fluid channel 705, pad 707 located between transmitter 703 and housing 704, securing clips 709 and 711, placement clips 713 and 715, inner sleeve 717, and protective cover plates 719 and 721 to protect the transducer assembly from the external environment.

Transmitter 703 can be any material, but is preferably a material whose acoustic response is more favorable along its longitudinal axis relative to its radial axis. In this way, the acoustic response is directed more towards the formation than the surrounding drill collar. Thus, the transmitter is preferably lead meta-niabate and more preferably lead titanate. As will be appreciated by those skilled in the art, other materials having a relatively high ratio of d33 to d31 can also be preferably employed.

The transmitter preferably comprises a plurality of discs with electrodes on the faces and poled to resonate in a thickness mode. Metal electrodes are preferably bonded between the discs, and the discs are preferably wired in parallel. Eccobond 276, along with catalyst 17-M1, both available from Emerson-Cuming, is preferably used to bond the ceramic discs and electrodes into a stack. The adhesive layer between the metal electrode and the ceramic is typically 1 mil thick. The discs are preferably arranged so that sides of like polarity face each other.

The metal electrodes are preferably 2 mil nickel, although other materials, e.g., copper, and/or other thicknesses can be employed. It is preferable to clean the electrodes before bonding, e.g., with #280 wet-dry paper, 3M scotch-brite and acetone.

It is preferable to keep a constant pressure on the stack while the adhesive is curing. The curing sequence is preferably four hours at 75° C., 8 hours at 121° C. and 3 hours at 175° C.

As will be appreciated by those in the art, operating a transmitter in a resonance mode produces maximum acoustic output. In order to minimize the overall length of the transmitter, as discussed in more detail below, the transmitter is preferably designed as a half wavelength resonator resonant in its fundamental mode.

As known in the art, the wavelength, $\lambda$, is defined as velocity over frequency.

$$\lambda = V_c / f_r$$

where $V_c$ represents the velocity of sound through the material of the transmitter; and $f_r$ represents the resonant frequency.

As stated above, the transmitter is preferably designed as a half wavelength resonator resonant in its fundamental mode. Thus:

$$d = \lambda/2$$

where d represents the total length of the transmitter.

Combining the above two equations, and solving for total length of the transmitter:

$$d = V_c / 2 f_r$$

Thus, as velocity of sound through the transmitter is a fixed quantity, total stack length is determined by the resonant frequency desired.

In situations where the dimensions of a drill collar are not adequate to contain the transmitter length, the resonant frequency can be modified so that the transmitter fits in the drill collar. Alternatively, a section of the transmitter can be replaced with a material whose acoustic length matches the acoustic length of the transmitter section removed but whose physical length is smaller.

The total length of the transmitter, d, in the above equation refers both to the physical as well as the acoustic length of the transmitter where the transmitter material is homogeneous. Otherwise, d represents the total acoustic length of the transmitter. Sound travels through some materials slower than through others. Thus, a shorter physical length of the former is required to produce the same acoustic length of the latter. The resulting substitution therefore produces a transmitter having an identical acoustic length but a shorter physical length. As the total acoustic length remains the same, so does the resonant frequency. The substituted piece can be placed at either terminal end or located somewhere therebetween. Any material whose acoustic velocity is less than the acoustic velocity of the original material will suffice.

Commonly employed drill collars range from 6.5 inches OD, 4.5 inches ID, to 9.5 inches OD, 5.7 inches ID. Thus, the center frequency will have a range of about 8.5 kHz to about 12 kHz. In the preferred embodiment for use with a drill collar of 8.5 inch OD, 4 inch ID, the transmitter will preferably comprise about 34 discs of lead titanate, each disc being 0.2 inches thick and 0.7 inches in diameter. Alternatively, the transmitter will comprise two sections of lead titanate and a center section of lead zirconate titanate. Each lead titanate section will comprise about 10 discs, the center section of lead zirconate titanate will comprise about 8 discs, each disc being 0.2 inches thick and 0.7 inches in diameter. In both cases, the transmitter will have a center frequency of about 10 kHz and a bandwidth between about 8 kHz and about 12 kHz.

Fluid channel 705 further isolates acoustic energy transmission from the source to drill collar 701. The channel can be filled with any material or composition, e.g., solid, liquid and/or gas. In the preferred embodiment, fluid channel 705 is filled with air. The fluid channel is preferably about 20 to 30 thousandths of an inch thick, and is preferably formed by the intersection of housing 704 and inner sleeve 717.

Acoustic transmitter 703 is further isolated from both drill collar 701 and housing 704 by pad 707. Pad 707 further acts to secure transmitter 703 in place, as does securing clips 709 and 711, placement clips 713 and 715, and protective cover plates 719 and 721. Plates 719 and 721 further act to protect the transmitter assembly from the hostile external environment. In the preferred embodiment, pad 707 is rubber, securing clips 709 and 711 are plastic, e.g., peek, placement clips 713 and 715 are steel, inner sleeve 717 is steel, and cover plates 719 and 721 are steel.

As will be appreciated by those skilled in the art, drilling fluid, e.g., mud, flows through the interior of the drill collar. It is therefore preferable that inner sleeve 717 at least be tapered about the exterior of the transmitter assembly to allow the drilling fluid to flow therearound. More preferably, inner sleeve 717 is extended throughout the interior of the drill collar, allowing, e.g., wires for electrical connections to the transmitter and receivers and the like to be placed at the drill collar, protection of the receiver and associated electronics (FIG. 10), and a fluid seal between internal grooves for placement of a fluid therein (FIG. 2). In the preferred embodiment, inner sleeve 717 is isolated from drill collar 701 via a gasket, e.g., rubber (not shown). Additionally, inner sleeve 717 can also include an imperforate stop band filter thereon to reduce any acoustic coupling.

Figure 9:
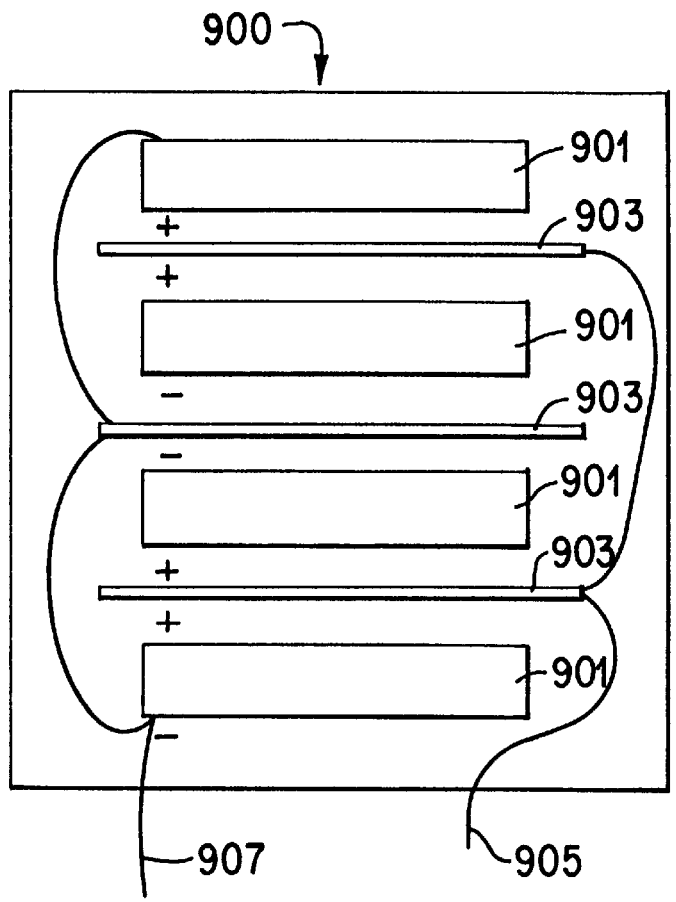
FIG. 9 shows a cross-sectional view of a preferred embodiment of the receiver of the present invention.
Figure 10:
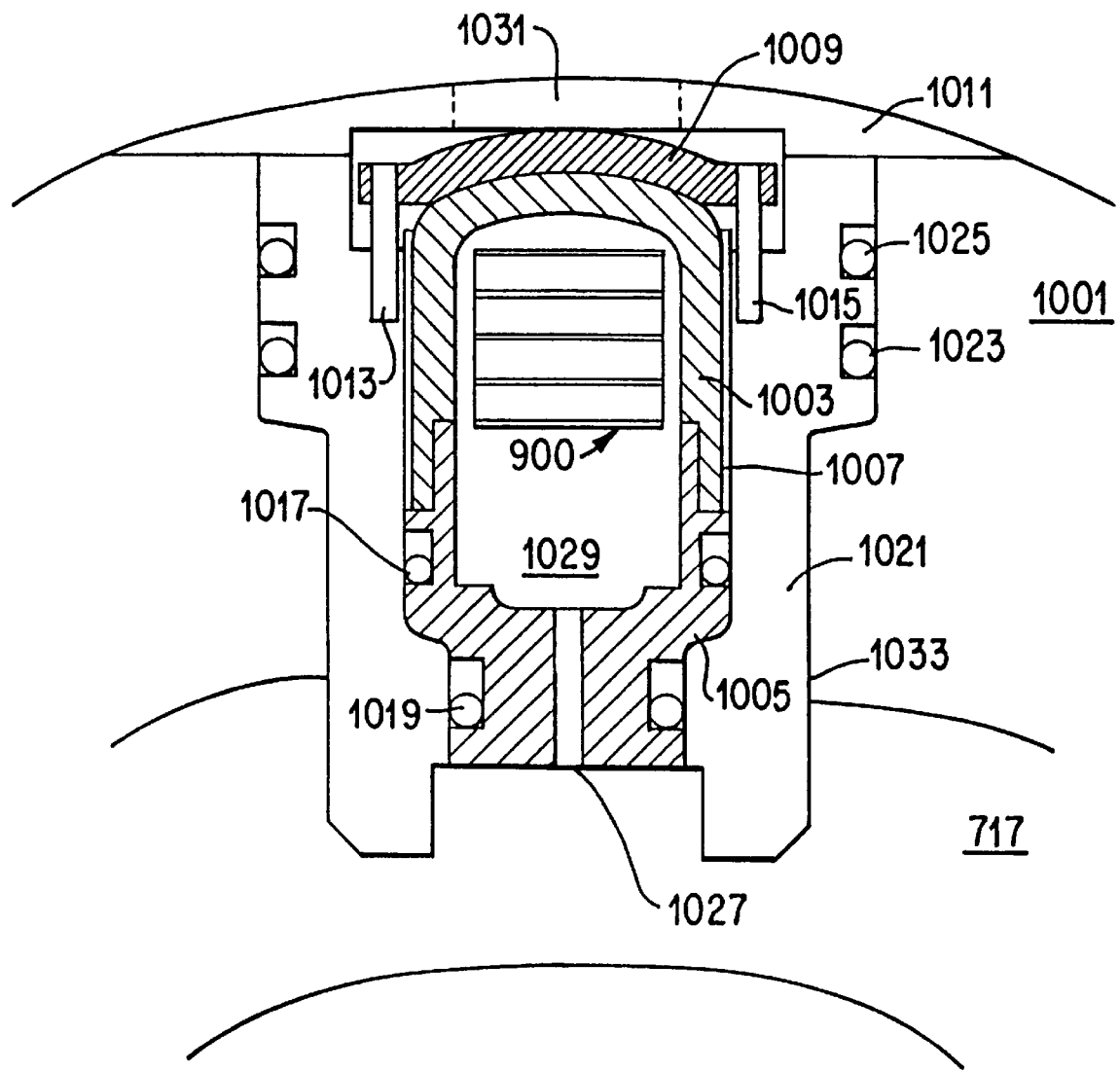
FIG. 10 shows a cross-sectional view of a drill collar through a preferred embodiment of the acoustic receiver of the present invention.

Turning now to FIG. 10, a cross-sectional view of the drill collar through a preferred embodiment of the acoustic receiver assembly of the present invention is illustrated. Each receiver 900, explained in more detail with reference to FIG. 9, comprises a stack of ceramic discs 901 and electrodes 903, positive lead 905 and ground lead 907. In the preferred embodiment, each disc is 0.1 inches thick, 0.5 inches in diameter. Preferably, the receiver stack comprises similar materials as and is assembled in similar fashion to the source stack as described in detail above, i.e., lead titanate discs, nickel electrodes with adhesive between the discs and electrodes.

Each receiver is preferably placed in drill collar 1001 as shown with reference to FIG. 10, wherein the receiver stack is protected by rubber sleeve 1003, steel sleeve 1005, steel tube 1007, inner plastic plate 1009 and outer steel plate 1011. Pins 1013 and 1015 help secure plate 1009 in place, while bolts (not shown) secure plate 1011 to drill collar 1001.

Leads from the stack are accessed via feedthrough 1027 to receiver electronics (not shown). O-rings 1017, 1019, 1023 and 1025 provide fluid isolation for electronics (not shown) located beyond feedthrough 1027 from possible mud infiltration via plate 1011, plate 1009 and/or steel housing 1021. In the preferred embodiment, the receiver stack is surrounded by rubber 1029 to isolate the receiver stack from drill collar. As described above, the receiver electronics and receiver leads are preferably protected by inner sleeve 717.

Figure 8:
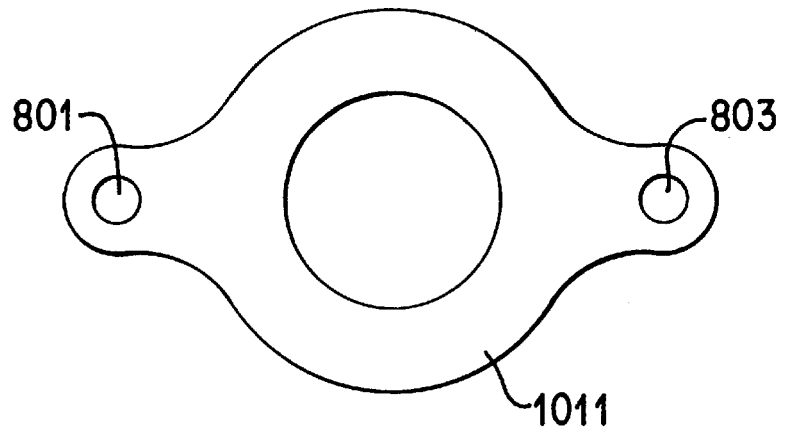
FIG. 8 shows a top view of the outer steel plate shown in FIG. 10.

In order for acoustic energy emitted from the transmitter to be received at receiver 900, outer steel plate 1011 preferably includes cut-out 1031. A top view of plate 1011 is shown with reference to FIG. 8, wherein holes 801 and 803 are shown for mounting the plate to the drill collar, as described above.

Optionally, a fluid chamber can be placed about the receiver assembly. Fluid channel 1033 further attenuates acoustic energy transmission through the drill collar to receiver 900. The channel can be filled with any material or composition, e.g., solid, liquid and/or gas. In the preferred embodiment, fluid channel 1033 is filled with air. The fluid channel is preferably formed by the intersection of housing 1021 with drill collar 1001 and inner sleeve 717.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

For example, although the present invention has been described with reference to a drill collar, the present invention is also applicable to drill strings as well as to logging sondes operable on conventional wirelines. As appreciated by those in the art, sonic wireline logging sondes often have acoustic energy propagating through the sonde housing, commonly referred to as tool arrivals. Several prior art techniques exist for removing the tool arrivals. It is contemplated that aspects of the present invention are applicable for reducing and/or eliminating wireline tool arrivals.

For example, a transversely mounted transmitter, isolating the transmitter from the sonde housing via a fluid channel, operating the transmitter at or near the natural stop band frequency of the sonde housing, providing a imperforate stop band filter between the transmitter and receivers, operating the transmitter at or near the center frequency of the imperforate stop band filter, and/or setting the center frequency of the imperforate stop band filter at or near the center frequency of the sonde's natural stop band filter.

What we claim as our invention is:

1. Method for determining characteristics of formations traversed by a borehole in which borehole a hollow cylindrical drill string is positioned comprising the steps of:

connecting to one segment of said drill string an elongated hollow drill collar so as to position said drill collar in said borehole; said drill collar being made of a material having a given acoustic transmission characteristic;

emitting at a first location on said drill collar an acoustic signal;

receiving, at a given frequency, at a second location on said drill collar a first direct arrival acoustic signal transmitted through said drill collar in response to the emission of said acoustic signal;

receiving, at said given frequency, at said second location on said drill collar a second direct arrival acoustic signal transmitted through a portion of said formations surrounding said drill collar in response to the emission of said acoustic signal; the arrival time at said second location of said first direct arrival acoustic signal being substantially the same as the arrival time at said second location of said second direct arrival acoustic signal;

wherein said frequency is selected by determining a natural stop band for said drill collar so that by positioning said emission of said acoustic signal on said drill collar the energy of said first direct arrival acoustic signal is reduced;

effecting at a third location on said drill collar intermediate said first and second locations, a change in the acoustic transmission characteristic of said drill collar material so that by effecting said change and the emission of said acoustic signal the energy of said first direct arrival acoustic signal is additionally reduced; and effecting the emission of said acoustic signal in a manner that enhances the coupling of the emitted acoustic energy to the formations relative to the coupling of the emitted acoustic energy to the drill collar.

2. The method of claim 1, wherein said step of effecting the change at said third location comprises the step of machining a plurality of grooves located on a hollow interior of said drill collar.

3. The method of claims 1, wherein said step of effecting the change at said third location comprises the step of machining a plurality of grooves located on the outside surface of said drill collar.

4. The method of claim 1, wherein said step of effecting the emission of said acoustic signal comprises the step of mounting a transmitter with an emission direction which is transverse to the longitudinal axis of said drill collar.

5. The method of claim 1 further comprising the step of locating about said transmitter a material for reducing the acoustic energy coupling from said transmitter to said drill collar.

6. The method of claim 2, wherein said plurality of grooves are machined to have a periodic structure related to said frequency.

7. The method of claims 2, further comprising the step of inserting into said plurality of grooves a material dissimilar in acoustic transmission characteristics from the material of said drill collar.

8. The method of claims 2, wherein said emission frequency of said acoustic signal is between from about 3 kHz to about 30 kHz and further comprising the step of receiving, at said given frequency, at a fourth location on said drill collar an acoustic signal arrival in response to said emission step.

9. The method of claim 1 wherein said step of effecting change at said third location effects a change in the direction of travel of at least one portion of said first direct arrival acoustic signal relative to the remainder of said first direct arrival acoustic signal.

10. Method for determining characteristics of earth formations traversed by a borehole in which borehole a hollow cylindrical drill string is positioned, the method comprising the steps of:

connecting to one segment of said drill string a hollow drill collar, said drill collar being made of a material having a given acoustic transmission characteristic;

emitting at a first location on said drill collar an acoustic signal having a given frequency;

receiving at a second location on said drill collar a first direct arrival acoustic signal transmitted through said drill collar in response to the emission of said acoustic signal;

receiving at said second location on said drill collar a second direct arrival acoustic signal transmitted through a portion of said formations surrounding said drill collar in response to the emission of said acoustic signal;

receiving at said second location on said drill collar a third arrival acoustic signal transmitted through said drill collar in response to the emission of said acoustic signal; the arrival time at said second location of said first, second and third arrival acoustic signals being substantially coincident;

effecting at a third location on said drill collar, intermediate said first and second locations, a change in the acoustic transmission characteristic of said drill collar material so that by effecting said change a portion of said third arrival acoustic signal is produced with a change in the direction of its travel relative to said first arrival acoustic signal; and effecting the emission of said acoustic signal in a manner that enhances the coupling of the energy of the emitted acoustic wave to the formations relative to the coupling of the energy of the emitted acoustic wave to the drill collar.

11. The method of claim 10 wherein said effecting step at said third location causes said portion of said third arrival acoustic signal to destructively interfere with said first arrival acoustic signal.

12. The method of claim 11, wherein said step of effecting at said third location includes the step of providing a plurality of grooves located on said drill collar.

13. The method of claim 12, wherein said step of providing said plurality of grooves includes the step of locating said grooves on an inside surface of said drill collar.

14. The method of claim 12, wherein said plurality of grooves have a periodic structure related to said frequency.

15. The method of claim 11, wherein said step of effecting the emission of said acoustic signal includes the step of mounting an acoustic transmitter with an emission direction which is transversely oriented relative to a longitudinal axis of said drill collar.

16. The method of claim 14, wherein said plurality of grooves contain a material dissimilar in acoustic transmission characteristics from the material of said drill collar.

17. The method of claims 10, wherein said frequency is selected with reference to a stop band characteristic of said drill collar with a center frequency located in or near said acoustic wave emission frequency.

18. The method of claims 10, wherein said center frequency is selected relative to the extensional wave velocity of the drill collar; the inner diameter of the drill collar; and the outer diameter of the drill collar.

19. The method of claim 18, wherein the step of effecting the emission of said acoustic signal includes the step of mounting a sonic signal transmitter in an outer wall section of said drill collar.

20. An apparatus for performing sonic logging while drilling with a hollow drill string having a drill bit at its lower end, comprising:

a drill collar adaptable to be incorporated into said drill string, said drill collar having an interior fluid channel for allowing drilling fluid to pass through said hollow drill string to said drill bit;

an acoustic transmitter mounted at a given location on said drill collar; said transmitter having a center frequency of emitted acoustic energy;

a first acoustic receiver mounted on said drill collar to receive acoustic energy emitted from said transmitter;

a second acoustic receiver mounted on said drill collar, and spaced apart from said first receiver, to receive acoustic energy emitted from said transmitter; and a stop band filter section located on said drill collar between said transmitter and said receivers;

wherein:

said drill collar being configured to exhibit a natural stop band about said center frequency so as to attenuate at least a portion of the acoustic energy propagating within said drill collar at said center frequency; and said stop band filter section is selected to further attenuate at least a portion of the acoustic energy propagating within said drill collar at said center frequency.

21. The apparatus of claim 20, wherein said stop band filter section is imperforate and comprises a plurality of grooves located on said interior fluid channel.

22. The apparatus of claim 20, wherein said stop band filter section comprises a plurality of grooves having a periodic structure related to said center frequency.

23. The apparatus of claim 20, wherein said stop band filter section comprises a plurality of grooves located on said interior fluid channel and on other surfaces of said drill collar.

24. The apparatus of claim 21, wherein said drill collar has a longitudinal axis, and wherein said transmitter is mounted so that the emission direction lays transversely to the longitudinal axis of said drill collar.

25. The apparatus of claim 24 further comprising means located about said transmitter for reducing the acoustic energy coupling from said transmitter to said drill collar.

26. The apparatus of claim 21, wherein said plurality of grooves have a periodic structure which effects the generation of refracted acoustic signals in response to the transmission therethrough of an acoustic signal.

27. The apparatus of claim 21, wherein said plurality of grooves contain a material dissimilar in acoustic characteristics from the material of said drill collar.

28. The apparatus of claim 20, wherein said stop band filter section is tuned to a center frequency located in or near said natural stop band of said drill collar.

29. The apparatus of claim 20 wherein the center frequency of said transmitter is selected based on the extensional wave velocity of the drill collar; the inner diameter of the drill collar; and the outer diameter of the drill collar.

30. Apparatus for determining characteristics of formations traversed by a borehole in which borehole a hollow cylindrical drill string is positioned, comprising:

an elongated hollow drill collar connected to one segment of said drill string so as to position said drill collar in said borehole; said drill collar being made of a material having a given acoustic transmission characteristic;

means for emitting at a first location on said drill collar an acoustic signal;

means for receiving at a second location on said drill collar a first direct arrival acoustic signal transmitted through said drill collar in response to the emission of said acoustic signal;

means for receiving at said second location on said drill collar and at a given frequency a second direct arrival acoustic signal transmitted through a portion of said formations surrounding said drill collar in response to the emission of said acoustic signal; the arrival time at said second location of said first direct arrival acoustic signal being substantially the same as the arrival time at said second location of said second direct arrival acoustic signal;

means for effecting at a third location on said drill collar intermediate said first and second locations, a change in the acoustic transmission characteristic of said drill collar material as to result in the energy of said first direct arrival acoustic signal being attenuated; and means for effecting the emission of said acoustic signal in a manner that enhances the coupling of the emitted acoustic energy to the formations relative to the coupling of the emitted acoustic energy to the drill collar.

31. The apparatus of claim 30, wherein said means for effecting the change at said third location comprises a plurality of grooves located on the hollow interior of said drill collar.

32. The apparatus of claim 30, wherein said means for effecting the change at said third location comprises a plurality of grooves located on the outside surface of said drill collar.

33. The apparatus of claim 31, wherein said means for effecting the change at said third location comprises a plurality of grooves located on the outside surface of said drill collar.

34. The apparatus of claim 31, wherein said means for effecting the emission of said acoustic signal comprises a transmitter which is mounted transversely to the longitudinal axis of said drill collar.

35. The apparatus of claim 30 further comprising means located about said transmitter for reducing the acoustic energy coupling from said transmitter to said drill collar.

36. The apparatus of claim 31, wherein said plurality of grooves have a periodic structure, and wherein said frequency is selected relative to a natural stop band on said drill collar so that the energy of said first direct arrival acoustic signal is reduced.

37. The apparatus of claim 31, further comprising a material dissimilar in acoustic transmission characteristics from the material of said drill collar inserted into said grooves.

38. The apparatus of claim 30, wherein said frequency is between from about 3 kHz to about 30 kHz.

39. The apparatus of claim 30 wherein said means for effecting change at said third location effects a shift in the direction of travel in at least one portion of said first direct arrival acoustic signal relative to the remainder of said first direct arrival acoustic signal.

40. Apparatus for determining characteristics of earth formations traversed by a borehole in which borehole a hollow cylindrical drill string is positioned, comprising:

means for connecting to one segment of said drill string a hollow drill collar, said drill collar being made of a material having a given acoustic transmission characteristic;

means for emitting at a first location on said drill collar an acoustic signal having a given frequency;

means for receiving at a second location on said drill collar a first direct arrival acoustic signal transmitted through said drill collar in response to the emission of said acoustic signal;

means for receiving at said second location on said drill collar a second direct arrival acoustic signal transmitted through a portion of said formations surrounding said drill collar in response to the emission of said acoustic signal;

means for receiving at said second location on said drill collar a third arrival acoustic signal transmitted through said drill collar in response to the emission of said acoustic signal; the arrival time at said second location of said first, second and third arrival acoustic signals being substantially coincident;

means for effecting at a third location on said drill collar, intermediate said first and second locations, a change in the acoustic transmission characteristic of said drill collar material so that by effecting said change said third arrival acoustic signal is produced with a shift in the direction of travel of at least a portion thereof relative to said first arrival acoustic signal; and means for effecting the emission of said acoustic signal in a manner that enhances the coupling of the energy of the emitted acoustic wave to the formations relative to the coupling of the energy of the emitted acoustic wave to the drill collar.

41. The apparatus of claim 40 wherein said effecting means at said third location causes said third arrival acoustic signal to destructively interfere with said first arrival acoustic signal.

42. The apparatus of claim 40, wherein said effecting means at said third location includes a plurality of grooves located on said drill collar and said first arrival represents a given acoustic propagation mode and said third arrival represents a different acoustic propagation mode.

43. The apparatus of claim 42, wherein said plurality of grooves are located on an inside surface of said drill collar.

44. The apparatus of claim 42, wherein said plurality of grooves have a periodic structure.

45. The apparatus of claim 41, wherein said effecting means for the emission of said acoustic signal comprises an acoustic transmitter mounted transversely to a longitudinal axis of said drill collar.

46. The apparatus of claim 44, wherein said plurality of grooves contain a material dissimilar in acoustic transmission characteristics from the material of said drill collar.

47. The apparatus of claim 40, wherein said given frequency is selected with regard to a stop band characteristic of said drill collar with a center frequency located in or near said given frequency.

48. The apparatus of claim 40 wherein said given frequency is selected based on the extensional wave velocity of the drill collar; the inner diameter of the drill collar; and the outer diameter of the drill collar.

49. The apparatus of claim 48, wherein said means for effecting the emission of said acoustic signal includes a sonic signal transmitter mounted transversely to a longitudinal axis of said drill collar.

50. A method for performing sonic logging while drilling comprising the steps of:

positioning a hollow drill string having a drill bit at its lower end in a borehole passing through earth formations;

incorporating a drill collar into said drill string, said drill collar having an interior fluid channel for allowing drilling fluid to pass through said hollow drill string to said drill bit;

emitting at a first location on said drill collar, an acoustic signal having a center frequency of emitted acoustic energy;

receiving at a second location on said drill collar, acoustic energy emitted from said first location;

receiving at a third location on said drill collar, separate from said second location, acoustic energy emitted from said first location;

locating a stop band filter on said drill collar between said first location and said second and third locations;

configuring said drill collar to exhibit a natural stop band at said center frequency to attenuate at least a portion of the acoustic energy propagating within said drill collar at said center frequency; and selecting said stop band filter to have characteristics that further attenuate at least a portion of the acoustic energy propagating within said drill collar at said center frequency.

51. The method of claim 50, wherein said stop band filter section is imperforate and comprises a plurality of grooves located on said interior fluid channel.

52. The method of claim 50, wherein said stop band filter section comprises a plurality of grooves located on the same surface of said drill collar on which said acoustic signal is emitted.

53. The method of claim 50, wherein said stop band filter section comprises a plurality of grooves located on said interior fluid channel and on other surfaces of said drill collar.

54. The method of claim 51, wherein said drill collar has a longitudinal axis, and wherein said emitting step utilizes a transmitter which is mounted transversely to the longitudinal axis of said drill collar.

55. The method of claim 54 further comprising the step of providing a material located about said transmitter for reducing the acoustic energy coupling from said transmitter to said drill collar.

56. The method of claim 51, wherein said plurality of grooves have a periodic structure which effects the generation of acoustic signals in response to the transmission therethrough of an acoustic signal.

57. The method of claim 51, wherein said plurality of grooves contain a material dissimilar from the material of said drill collar.

58. The method of claim 50, wherein said stop band filter section has a center frequency located in or near said natural stop band of said drill collar.

59. The method of claim 54 wherein said center frequency of said transmitter is related to the extensional wave velocity of the drill collar; the inner diameter of the drill collar; and the outer diameter of the drill collar.

60. A method for performing sonic logging while drilling a borehole traversing an earth formation, including drilling the borehole with a drill string having a drill bit at its lower end and drilling fluid in the borehole surrounding the drill string, the steps comprising:

a) drilling with a drill collar incorporated into the drill string;

b) transmitting, from a location on said drill collar, acoustic energy into the surrounding earth formations;

c) receiving, at a location on said drill collar, acoustic energy returned from the surrounding earth formations;

d) providing an output related to the received acoustic energy; and e) determining from said output a characteristic of said earth formations.

61. A method for performing sonic logging while drilling a borehole traversing an earth formation to determine characteristics of said earth formation, the steps comprising:

a) drilling a borehole with a drill collar supporting a drill bit;

b) transmitting acoustic energy with a transmitter mounted on the drill collar; and c) receiving acoustic energy with at least one receiver mounted on the drill collar;

d) wherein step b) includes the step of transmitting the acoustic energy about a given center frequency which allows the determination of said formation characteristics.

62. The method of claim 60 further comprising the step of:

attenuating acoustic energy transmitted through said drill collar in a predetermined band of frequencies about said given center frequency.

63. An apparatus for performing sonic logging while drilling a borehole traversing an earth formation to determine characteristics of said earth formation, comprising:

a) a drill collar for supporting a drill bit during drilling;

b) a transmitter mounted on said drill collar;

c) at least one receiver mounted on said drill collar to receive acoustic energy emitted from said transmitter; and d) wherein said receiver is responsive to acoustic energy about a given center frequency which allows the determination of said formation characteristic.

64. The apparatus of claim 63, further comprising:

a stop band filter located on said drill collar and having a predetermined band of frequencies, including said given center frequency, at which acoustic energy is attenuated.

65. A method for performing sonic logging while drilling a borehole traversing an earth formation to determine characteristics of said formation, the steps comprising:

a) drilling a borehole with a drill collar supporting a drill bit;

b) transmitting acoustic energy with a transmitter mounted on the drill collar while drilling;

c) receiving acoustic energy with at least one receiver mounted on the drill collar while drilling;

d) providing an output related to the received acoustic energy; and e) determining from said output a characteristic of said earth formation.

66. The method of claim 65, further including the step of:

attenuating acoustic energy in a predetermined band of frequencies, having a first center frequency, with stop band filter located on the drill collar between the transmitter and the at least one receiver.

67. The method of claim 66, further comprising in the receiving step:

receiving acoustic energy at a second center frequency located at or near said first center frequency of the predetermined band of frequencies.

* * * * *